United States Patent
Manolakos et al.

(10) Patent No.: US 12,526,802 B2
(45) Date of Patent: Jan. 13, 2026

(54) QUASI-COLOCATION AND AUTOMATIC GAIN CONTROL DETERMINATION FOR MULTI-RELAY SIDELINK COMMUNICATIONS

(71) Applicant: QUALCOMM Incorporated, San Diego, CA (US)

(72) Inventors: Alexandros Manolakos, Escondido, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 18/550,609

(22) PCT Filed: Apr. 29, 2022

(86) PCT No.: PCT/US2022/027071
§ 371 (c)(1),
(2) Date: Sep. 14, 2023

(87) PCT Pub. No.: WO2022/235519
PCT Pub. Date: Nov. 10, 2022

(65) Prior Publication Data
US 2024/0298319 A1 Sep. 5, 2024

(30) Foreign Application Priority Data

May 6, 2021 (GR) ............................... 20210100307

(51) Int. Cl.
*H04W 72/20* (2023.01)
*H04W 24/08* (2009.01)

(52) U.S. Cl.
CPC ........... *H04W 72/20* (2023.01); *H04W 24/08* (2013.01)

(58) Field of Classification Search
USPC ....... 370/229, 230, 236, 252, 254, 311, 315, 370/328, 329, 330, 389, 390, 492, 501
See application file for complete search history.

(56) References Cited

U.S. PATENT DOCUMENTS

2021/0037503 A1 2/2021 Nam et al.
2021/0037532 A1* 2/2021 Nam ....................... H04L 5/005
(Continued)

FOREIGN PATENT DOCUMENTS

WO WO-2020033088 A1 2/2020

OTHER PUBLICATIONS

International Search Report and Written Opinion—PCT/US2022/027071—ISA/EPO—Aug. 4, 2022.

*Primary Examiner* — Nguyen H Ngo
(74) *Attorney, Agent, or Firm* — Holland & Hart LLP

(57) ABSTRACT

Methods, systems, and devices for wireless communication at a remote user equipment (UE) are described. A remote UE may identify a quasi-colocation relationship between one or more control regions of resources during a time interval and a set of data regions of the resources during the time interval. In some examples, the set of data regions may include at least a first data region for a first relay UE and a second data region for a second relay UE. The remote UE may identify, according to the quasi-colocation relationship, one or more symbol periods for one or more automatic gain control measurements. The remote UE performs the one or more automatic gain control measurements on signals received in the one or more symbol periods and receive a first data message in the first data region and a second data message in the second data region.

30 Claims, 22 Drawing Sheets

(56) References Cited

U.S. PATENT DOCUMENTS

| | | | |
|---|---|---|---|
| 2021/0143895 A1* | 5/2021 | Kim | H04W 4/40 |
| 2022/0116924 A1* | 4/2022 | Takeda | H04B 7/0695 |
| 2022/0141779 A1* | 5/2022 | Ren | H04W 52/241 |
| | | | 455/522 |

* cited by examiner

705 — Physical Sidelink Shared Channel From Relay 1
710 — Physical Sidelink Shared Channel From Relay 2
715 — Physical Sidelink Control Channel From Relay 1
720 — Gap Symbol
725 — Automatic Gain Control Symbol
730 — Reference Signal

700

905 Physical Sidelink Shared Channel From Relay 1
910 Physical Sidelink Shared Channel From Relay 2
915 Physical Sidelink Control Channel From Relay 1
920 Gap Symbol
925 Automatic Gain Control Symbol
930 Physical Sidelink Control Channel From Relay 2

900

QUASI-COLOCATION AND AUTOMATIC GAIN CONTROL DETERMINATION FOR MULTI-RELAY SIDELINK COMMUNICATIONS

CROSS REFERENCE

The present application is a 371 national stage filing of International PCT Application No. PCT/US2022/027071 by MANOLAKOS et al. entitled "QUASI-COLOCATION AND AUTOMATIC GAIN CONTROL DETERMINATION FOR MULTI-RELAY SIDELINK COMMUNICATIONS," filed Apr. 29, 2022; and claims priority to Greece Patent Application No. 20210100307 by MANOLAKOS et al., entitled "QUASI-COLOCATION AND AUTOMATIC GAIN CONTROL DETERMINATION FOR MULTI-RELAY SIDELINK COMMUNICATIONS," filed May 6, 2021, each of which is assigned to the assignee hereof, and each of which is expressly incorporated by reference in its entirety herein.

FIELD OF TECHNOLOGY

The following relates to wireless communication at a remote user equipment (UE), including quasi-colocation and automatic gain control determination for multi-relay sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may configure UEs for relay operation to relay UEs and remote UEs. However, in some examples, relay techniques may be deficient SUMMARY The described techniques relate to improved methods, systems, devices, and apparatuses that support quasi-colocation and automatic gain control determination for multi-relay sidelink communications. Generally, the described techniques provide for a base station to signal a configuration for relay operation to relay user equipments (UEs) and remote UEs. In some examples, the base station may transmit a configuration (e.g., a multiple relay configuration) in a first mode of operation (e.g., Mode 1 resource allocation) and a second mode of operation (Mode 2 resource allocation). In some cases, a base station may communicate with more than one relay UEs (e.g., via multiple paths). The relay UEs may transmit relay transmissions using a single sidelink control information or multiple sidelink control information. Transmissions associated with single sidelink control information or multiple sidelink control information may be spatial division multiplexed, time division multiplexed, or frequency division multiplexed.

A remote UE may receive data from multiple relay UEs in a time interval. The remote UE may identify a quasi-colocation relationship between control regions and data regions of the time interval. In some examples, the data may be transmitted by a first relay UE and a second relay UE. A remote UE may identify the quasi-colocation relationship and may identify symbols for performing automatic gain control measurement. The remote UE then performs automatic gain control measurements on the identified symbols and receives data based on performing the automatic gain control measurements.

A method for wireless communication at a remote user equipment (UE) is described. The method may include identifying a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs, identifying, according to the quasi-colocation relationship, one or more symbol periods of the time interval for one or more automatic gain control measurements for the one or more control regions and the set of multiple data regions, performing the one or more automatic gain control measurements on signals received in the one or more symbol periods of the time interval for the one or more automatic gain control measurements, and receiving, based on the one or more automatic gain control measurements, a first data message from the first relay UE in the first data region and a second data message from the second relay UE in the second data region.

An apparatus for wireless communication at a remote UE is described. The apparatus may include a processor, memory coupled with the processor, and instructions stored in the memory. The instructions may be executable by the processor to cause the apparatus to identify a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs, identify, according to the quasi-colocation relationship, one or more symbol periods of the time interval for one or more automatic gain control measurements for the one or more control regions and the set of multiple data regions, perform the one or more automatic gain control measurements on signals received in the one or more symbol periods of the time interval for the one or more automatic gain control measurements, and receive, based on the one or more automatic gain control measurements, a first data message from the first relay UE in the first data region and a second data message from the second relay UE in the second data region.

Another apparatus for wireless communication at a remote UE is described. The apparatus may include means for identifying a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs, means for identifying, according to the quasi-colocation relationship, one or more symbol periods of the time interval for one or more automatic gain control measurements for the one or more control regions and the set of multiple data regions, means for performing the one or more automatic gain control measurements on signals received in the one or more symbol periods of the time interval for the one or more automatic gain control measurements, and means for receiving, based on the one or more automatic gain control measurements, a first data message from the first relay UE in the first data region and a second data message from the second relay UE in the second data region.

A non-transitory computer-readable medium storing code for wireless communication at a remote UE is described. The code may include instructions executable by a processor to identify a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs, identify, according to the quasi-colocation relationship, one or more symbol periods of the time interval for one or more automatic gain control measurements for the one or more control regions and the set of multiple data regions, perform the one or more automatic gain control measurements on signals received in the one or more symbol periods of the time interval for the one or more automatic gain control measurements, and receive, based on the one or more automatic gain control measurements, a first data message from the first relay UE in the first data region and a second data message from the second relay UE in the second data region.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a first symbol period preceding the first data region for the first relay UE and a second symbol period preceding the second data region for the second relay UE for the one or more automatic gain control measurements, where performing the one or more automatic gain control measurements includes performing the one or more automatic gain control measurements on the signals received in the first symbol period and the second symbol period.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a symbol period preceding a control region of the one or more control regions and the second data region for the second relay UE for the one or more automatic gain control measurements, where the control region and the second data region may be frequency division multiplexed, and where performing the one or more automatic gain control measurements includes performing the one or more automatic gain control measurements on the signals received in the identified symbol period.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a first symbol period preceding a control region of the one or more control regions and the first data region for the first relay UE for the one or more automatic gain control measurements, where the control region and the first data region may be frequency division multiplexed and identifying, according to the quasi-colocation relationship, a second symbol period preceding the second data region for the second relay UE for the one or more automatic gain control measurements, where performing the one or more automatic gain control measurements includes performing the one or more automatic gain control measurements on the signals received in the first symbol period and the second symbol period.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a first symbol period preceding a control region of the one or more control regions and the first data region for the first relay UE for the one or more automatic gain control measurements, where the control region and the first data region may be included in a first slot of the time interval and identifying, according to the quasi-colocation relationship, a second symbol period preceding the second data region for the second relay UE for the one or more automatic gain control measurements, where the second data region may be included in a second slot of the time interval, and where performing the one or more automatic gain control measurements includes performing the one or more automatic gain control measurements on the signals received in the first symbol period and the second symbol period.

Some examples of the method, apparatuses, and non-transitory computer-readable medium described herein may further include operations, features, means, or instructions for transmitting an indication of a capability of the remote UE to track simultaneously at least two sidelink quasi-colocation parameters. In some examples of the method, apparatuses, and non-transitory computer-readable medium described herein, identifying the quasi-colocation relationship between the one or more control regions and the set of multiple data regions may include operations, features, means, or instructions for identifying the quasi-colocation relationship between a first control region of the one or more control regions and the first data region, and between one or more reference signals in the first control region and the second data region.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a symbol period preceding the first control region including the one or more reference signals for the one or more automatic gain control measurements, where performing the one or more automatic gain control measurements includes performing the one or more automatic gain control measurements on the signals received in the identified symbol period.

Some examples of the method, apparatuses, and non-transitory computer-readable medium described herein may further include operations, features, means, or instructions for performing a channel state information measurement to calculate a relative power offset between the first data region for the first relay UE and the second data region for the second relay UE.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a symbol period preceding a first control region of the one or more control regions for the one or more automatic gain control measurements, where performing the one or more automatic gain control measurements includes performing the one or more automatic gain control measurements on the signals received in the identified symbol period.

In some examples of the method, apparatuses, and non-transitory computer-readable medium described herein, a second control region of the one or more control regions succeeds the first control region, the first control region being associated with the first relay UE and the second control region being associated with the second relay UE.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a first symbol period preceding a first control region of the one or more control regions and a second control region of the one or more control regions for the one or more automatic gain control measurements, where the first control region and the second control region may be frequency division multiplexed, the first control region being associated with the first relay UE and the second control region being associated with the second relay UE.

Some examples of the method, apparatuses, and non-transitory computer-readable medium described herein may further include operations, features, means, or instructions for identifying, according to the quasi-colocation relationship, a second symbol period preceding the first data region and the second control region for the one or more automatic gain control measurements, where the first data region and the second data region may be frequency division multiplexed, and where performing the one or more automatic gain control measurements includes performing the one or more automatic gain control measurements on the signals received in the first symbol period and the second symbol period.

Some examples of the method, apparatuses, and non-transitory computer-readable medium described herein may further include operations, features, means, or instructions for receiving an indication of the quasi-colocation relationship between the one or more control regions of the time interval and the set of multiple data regions of the time interval for the communications via the set of multiple relay UEs, where the indication includes at least one of a radio resource control signal or a sidelink control information.

A method for wireless communication at a wireless node is described. The method may include identifying a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs, identifying, according to the quasi-colocation relationship, one or more symbol periods of the time interval for one or more automatic gain control measurements by the remote UE for the one or more control regions and the set of multiple data regions, and transmitting, based on identifying the one or more symbol periods of the time interval for the one or more automatic gain control measurements, a first data message to the remote UE via the first relay UE in the first data region and a second data message to the remote UE via the second relay UE in the second data region.

An apparatus for wireless communication at a wireless node is described. The apparatus may include a processor, memory coupled with the processor, and instructions stored in the memory. The instructions may be executable by the processor to cause the apparatus to identify a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs, identify, according to the quasi-colocation relationship, one or more symbol periods of the time interval for one or more automatic gain control measurements by the remote UE for the one or more control regions and the set of multiple data regions, and transmit, based on identifying the one or more symbol periods of the time interval for the one or more automatic gain control measurements, a first data message to the remote UE via the first relay UE in the first data region and a second data message to the remote UE via the second relay UE in the second data region.

Another apparatus for wireless communication at a wireless node is described. The apparatus may include means for identifying a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs, means for identifying, according to the quasi-colocation relationship, one or more symbol periods of the time interval for one or more automatic gain control measurements by the remote UE for the one or more control regions and the set of multiple data regions, and means for transmitting, based on identifying the one or more symbol periods of the time interval for the one or more automatic gain control measurements, a first data message to the remote UE via the first relay UE in the first data region and a second data message to the remote UE via the second relay UE in the second data region.

A non-transitory computer-readable medium storing code for wireless communication at a wireless node is described. The code may include instructions executable by a processor to identify a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs, identify, according to the quasi-colocation relationship, one or more symbol periods of the time interval for one or more automatic gain control measurements by the remote UE for the one or more control regions and the set of multiple data regions, and transmit, based on identifying the one or more symbol periods of the time interval for the one or more automatic gain control measurements, a first data message to the remote UE via the first relay UE in the first data region and a second data message to the remote UE via the second relay UE in the second data region.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a first symbol period preceding the first data region for the first relay UE and a second symbol period preceding the second data region for the second relay UE for the one or more automatic gain control measurements.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a symbol period preceding a control region of the one or more control regions and the second data region for the second relay UE for the one or more automatic gain control measurements, where the control region and the second data region may be frequency division multiplexed.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a first symbol period preceding a control region of the one or more control regions and the first data region for the first relay UE for the one or more automatic gain control measurements, where the control region and the first data region may be frequency division multiplexed and identifying, according to the quasi-colocation relationship, a second symbol period preceding the second data region for the second relay UE for the one or more automatic gain control measurements.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a first symbol period preceding a control region of the one or more control regions and the first data region for the first relay UE for the one or more automatic gain control measurements, where the control region and the first data region may be included in a first slot of the time interval and identifying, according to the quasi-colocation relationship, a second symbol period preceding the second data region for the second relay UE for the one or more automatic gain control measurements, where the second data region may be included in a second slot of the time interval.

Some examples of the method, apparatuses, and non-transitory computer-readable medium described herein may further include operations, features, means, or instructions for receiving, from the remote UE, an indication of a capability of the remote UE to simultaneously track at least two sidelink quasi-colocation parameters. In some examples of the method, apparatuses, and non-transitory computer-readable medium described herein, identifying the quasi-colocation relationship between the one or more control regions and the set of multiple data regions may include operations, features, means, or instructions for identifying the quasi-colocation relationship between a first control region of the one or more control regions and the first data region, and between one or more reference signals in the first control region and the second data region and transmitting the one or more reference signals in the first control region.

In some examples of the method, apparatuses, and non-transitory computer-readable medium described herein, identifying the one or more symbol periods of the time interval for the one or more automatic gain control measurements may include operations, features, means, or instructions for identifying, according to the quasi-colocation relationship, a first symbol period preceding a first control region of the one or more control regions and a second control region of the one or more control regions for the one or more automatic gain control measurements, where the first control region and the second control region may be frequency division multiplexed, the first control region being associated with the first relay UE and the second control region being associated with the second relay UE.

Some examples of the method, apparatuses, and non-transitory computer-readable medium described herein may further include operations, features, means, or instructions for identifying, according to the quasi-colocation relationship, a second symbol period preceding the first data region and the second control region for the one or more automatic gain control measurements, where the first data region and the second data region may be frequency division multiplexed. Some examples of the method, apparatuses, and non-transitory computer-readable medium described herein may further include operations, features, means, or instructions for transmitting an indication of the quasi-colocation relationship between the one or more control regions of the time interval and the set of multiple data regions of the time interval for the communications of the wireless node with the remote UE via the set of multiple relay UEs, where the indication includes at least one of a radio resource control signal or a sidelink control information. In some examples of the method, apparatuses, and non-transitory computer-readable medium described herein, the wireless node includes a UE or a base station.

DETAILED DESCRIPTION

Figure 1:
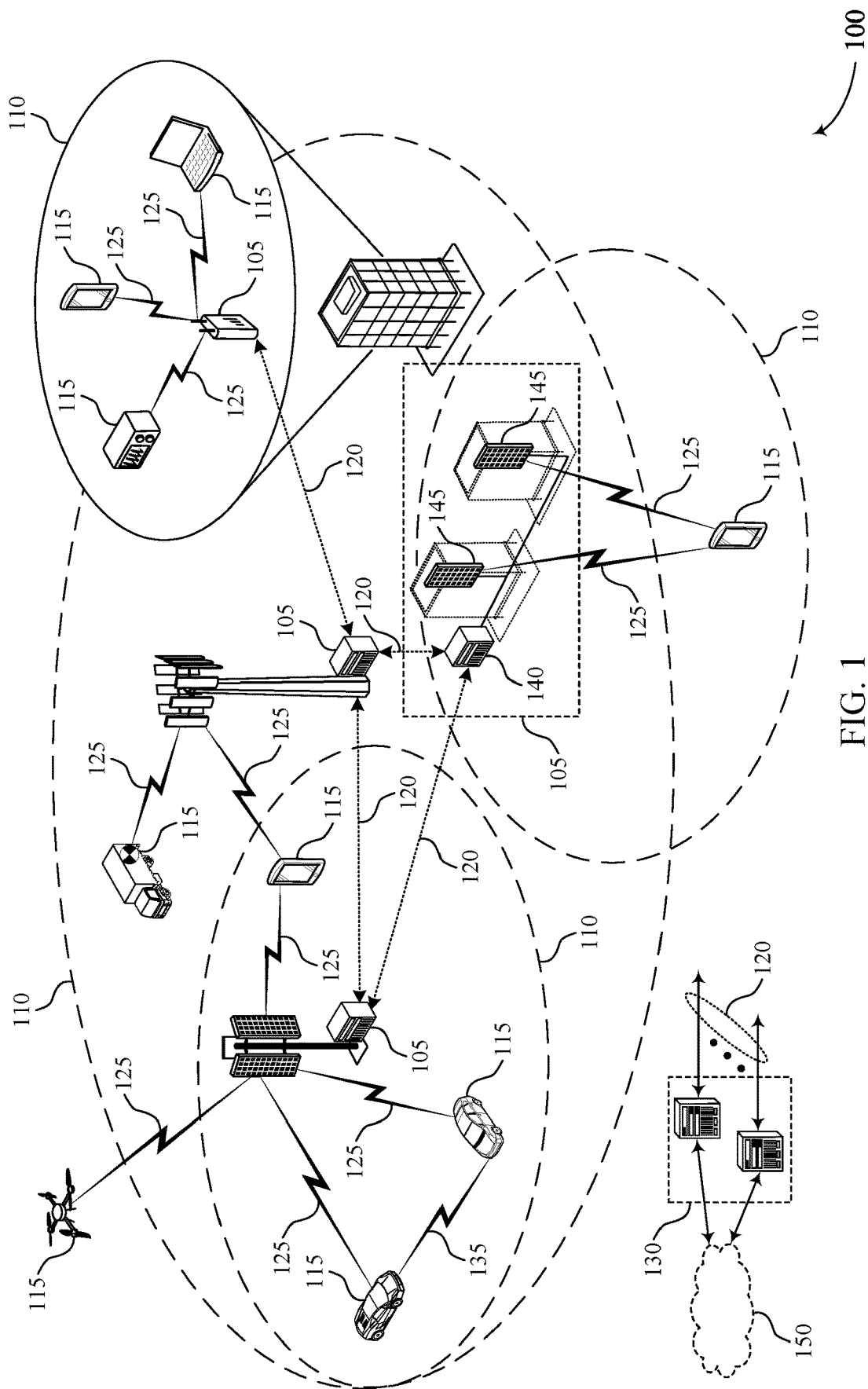
FIG. 1 illustrates an example of a wireless communications system that supports quasi-colocation and automatic gain control determination for multi-relay sidelink communications in accordance with aspects of the present disclosure.

A wireless communications system may support communication between one or more communication device. In particular, a wireless communications system may support both access links and sidelinks for communications between one or more communication devices. An access link may refer to a communication link between a UE and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and one or more other UEs within a coverage area. In some examples, the coverage area may include the group of UEs (e.g., a coverage area provided by a base station, a coverage area outside of the coverage area provided by the base station, or a combination thereof). In some wireless communications systems, a base station may communicate with a remote UE (e.g., a device outside of a coverage area of the base station or in a lower-coverage area of the base station) over a communication link that may include multiple links. For example, the communication link may include a sidelink link between the remote UE and a relay UE (e.g., a device in a coverage area of the base station and that provides coverage to the remote UE) and a relay link (e.g., a direct link) between the relay UE and the base station. In some examples, the remote UE may transmit information (e.g., one or more data or control messages) to the relay UE over the sidelink link, and the relay UE may relay or forward (e.g., transmit, retransmit) the information to the base station over the relay link. Additionally or alternatively, the base station may transmit information to the relay UE over the relay link and the relay UE may relay or forward (e.g., transmit, retransmit) the information to the remote UE over the sidelink link.

In some examples, sidelink communications may support two modes of resource allocation mechanism. In a first mode of operation (e.g., Mode 1 resource allocation), resources may be scheduled by a base station. In a second mode of operation (e.g., Mode 2 resource allocation), base stations may not be involved in sidelink communications and UEs may perform autonomous resource selection. For example, a UE may reserve a set of resources without a base station allocating resources to UEs participating in sidelink communications. In some cases, in the second resource allocation (e.g., Mode 2 resource allocation), sidelink coordination across relay UEs may be determined by the relay UEs. In some cases, sidelink communications may support a single sidelink control information or multiple sidelink control information. In single sidelink control information, a first control message (from a first relay UE) indicates data from both the first relay UE and a second relay UE. In multiple sidelink control information, separate control messages (from separate relays) may indicate data from separate relays. Transmissions associated with a single sidelink control information or multiple sidelink control information may be spatial division multiplexed, time division multiplexed, or frequency division multiplexed.

Aspects of the present disclosure provide for a quasi-colocation relationship between control regions and data regions, where the data is transmitted by a first relay UE and a second relay UE. In particular, a remote UE may identify the quasi-colocation relationship and may identify symbols for performing automatic gain control measurements. The remote UE then performs measurements for automatic gain control on the identified symbols, such as measuring a received signal power (e.g., one or more of received signal strength indication, signal to noise ratio, or signal to interference noise ratio), and then uses a result of the performed measurements to perform automatic gain control to receive data. A UE may use the automatic gain control measurements to adjust one or more components of a receive chain to receive signal (e.g., subsequently received signals), for example the gain of one or more low noise amplifier of the radio frequency front end of the receive chain of the UE.

In some examples, where multiple data channels are time division multiplexed in one time interval, the remote UE may assume two symbols (e.g., symbol periods) for performing automatic gain control measurements (e.g., one symbol before the data region from the first relay UE and one symbol before the data region from the second relay UE). Additionally or alternatively, where multiple data channels are frequency division multiplexed in one time interval, the remote UE may assume a single symbol for performing automatic gain control measurements.

Particular aspects of the subject matter described herein may be implemented to realize one or more advantages. The described techniques may support improvements in spatial diversity, for example for supporting ultra-reliable low latency communications or other applications, by increasing coverage, or reducing signaling overhead, or both. Further, in some examples, the multiple relay UE configurations as described herein may support higher data rates, or diversity, or both, for control, data, or control and data, by providing multiple relay paths in case of blocking or fading of one or more paths, thereby improving latency, reliability, or both. As such, supported techniques may include improved network operations, and, in some examples, may promote network efficiencies, among other benefits.

Aspects of the disclosure are initially described in the context of wireless communications systems. Aspects of the disclosure are further described in the context of resource allocations. Aspects of the disclosure are further illustrated by and described with reference to apparatus diagrams, system diagrams, and flowcharts that relate to quasi-colocation and automatic gain control determination for multi-relay sidelink communications.

FIG. 1 illustrates an example of a wireless communications system 100 that supports quasi-colocation and automatic gain control determination for multi-relay sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to one or more aspects of the present disclosure, a remote UE 115 may identify a quasi-colocation relationship between one or more control regions of resources during a time interval and a set of data regions of the resources during the time interval for communications via a set of relay UEs 115. In some examples, the set of data regions may include at least a first data region for a first relay UE 115 of the set of relay UEs 115 and a second data region for a second relay UE 115 of the set of relay UEs 115. The remote UE 115 may identify, according to the quasi-colocation relationship, one or more symbol periods of the time interval for one or more automatic gain control measurements (e.g., one or more measurements of signals received one a set of resource elements during one or more symbol periods that are used for automatic gain control) for the one or more control regions and the set of data regions. In some examples, the remote UE 115 may perform the one or more automatic gain control measurements on signals received in the one or more symbol periods of the time interval for the one or more automatic gain control measurements. The remote UE 115 may then receive, based on the one or more automatic gain control measurements, a first data message from the first relay UE 115 in the first data region and a second data message from the second relay UE 115 in the second data region.

Figure 2:
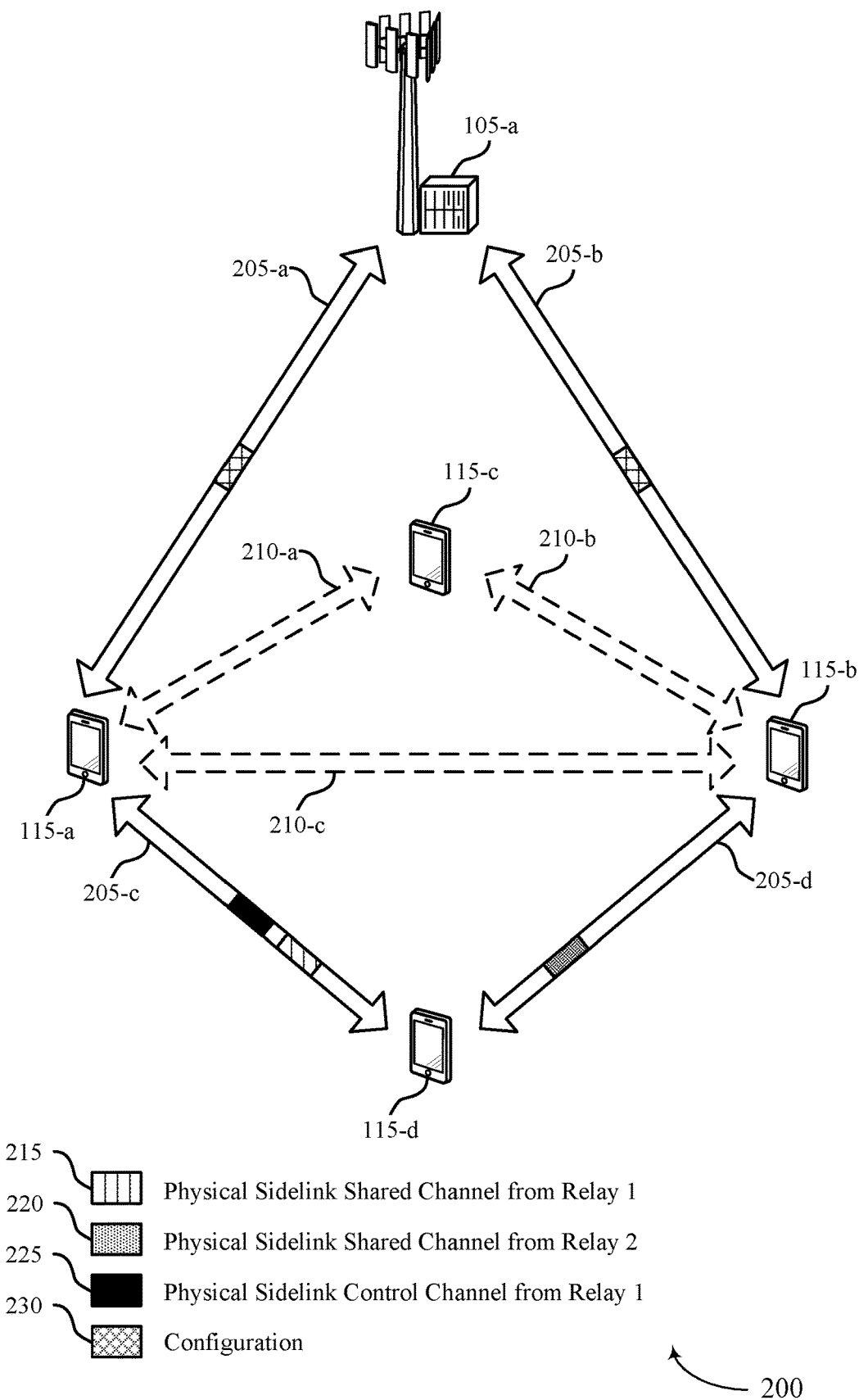
FIG. 2 illustrates an example of a wireless communications system that supports quasi-colocation and automatic gain control determination for multi-relay sidelink communications in accordance with aspects of the present disclosure.

FIG. 2 illustrates an example of a wireless communications system 200 that supports quasi-colocation and automatic gain control determination for multi-relay sidelink communications in accordance with aspects of the present disclosure. In some examples, the wireless communications system 200 may implement, or be implemented by, aspects of wireless communications system 100. For example, the wireless communications system 200 may include a base station 105-*a*, a UE 115-*a*, a UE 115-*b*, a UE 115-*c*, and a UE 115-*d*, which may be examples of corresponding devices described herein with reference to FIG. 1. In the example of FIG. 2, the UE 115-*a* and the UE 115-*b* may be examples of relay UEs, the UE 115-*c* may be an example of a source UE and the UE 115-*d* may be an example of a remote UE.

In some examples, a base station 105-*a* may communicate with a remote UE 115-*d* (e.g., a device outside of a coverage area of the base station 105-*a* or in a lower-coverage area of the base station 105-*a*) over a communication link 205 that includes multiple communication links 205. For example, the communication links 205 may include a sidelink link 205-*c* between the remote UE 115-*d* and a relay UE 115-*a* (e.g., a device in a coverage area of the base station 105-*a* and that provides coverage to the remote UE 115-*d*) and a relay link 205-*a* (e.g., a direct link) between the relay UE 115-*a* and the base station 105-*a*. The communications links 205 may also include a sidelink link 205-*d* between the remote UE 115-*d* and a relay UE 115-*b* and a relay link 205-*b* (e.g., a direct link) between the relay UE 115-*b* and the base station 105-*a*.

In an example of uplink communication, the remote UE 115-*d* may transmit information (e.g., one or more data or control messages) to the relay UE 115-*a* and the relay UE 115-*b* over the sidelink link 205-*c* and the sidelink link 205-*d*, and the relay UE 115-*a* and the relay UE 115-*b* may relay or forward (e.g., transmit, retransmit) the information to the base station 105-*a* over the relay link 205-*a* and the relay link 205-*b* respectively. In an example of downlink communication, the base station 105-*a* may transmit information to the relay UE 115-*a* and the relay UE 115-*b* over the relay link 205-*a* and the relay link 205-*b* respectively, and the relay UE 115-*a* and the relay UE 115-*b* may relay or forward (e.g., transmit, retransmit) the information to the remote UE 115-*d* over the sidelink link 205-*c* and the sidelink link 205-*d* respectively. The relay UE 115-*a* and the relay UE 115-*b* may also transmit additional information (e.g., one or more data or control messages originating at the relay UEs 115) to the base station 105 via the relay link 205-*a* and the relay link 205-*b* (e.g., the direct link).

In some examples, the relay UEs 115 may operate in Mode 1 resource allocation, where sidelink coordination across relay UEs 115 may be determined by the base station 105-*a* and indicated to the relay UEs 115 via configuration 230. Additionally or alternatively, in Mode 2 resource allocation, sidelink coordination across relays may be determined by the relay UEs (e.g., a primary UE of the UEs) or a network device (e.g., base station). In Mode 2 resource allocation, relay UEs may optionally negotiate over communication link 210-*c* to identify sidelink coordination. Some wireless communications techniques may not provide for managing the transmissions across multiple relay UEs in a group of relay UEs.

In some aspects, a sidelink slot structure may indicate that a slot includes 14 OFDM symbols. Sidelink resources can be configured to occupy fewer than 14 symbols in a slot. In some examples, a first symbol in a slot may be repeated on a preceding symbol for automatic gain control measurement. A slot including a physical sidelink shared channel may also include a gap symbol (e.g., a symbol period or sub-symbol period during which communications are not expected, not configured, or otherwise not available or allocated for communications). A sub-channel size can be configured to a set of physical resource blocks (e.g., a set of 10, 15, 20, 25, 50, 75, 100, or another number of physical resource blocks). In some examples, a control region and a data region may be transmitted in the same slot. Sidelink control information may include transmission in two stages for forward compatibility. A first stage control (e.g., first sidelink control information (SCI-1)) may be transmitted on physical sidelink control channel and may include information for resource allocation and decoding second stage control. A second stage control (e.g., second sidelink control information (SCI-2)) may be transmitted on the physical sidelink control channel and may include information for decoding data (e.g., transmitted on the shared channel). In some examples, SCI-1 may be decodable by UEs. Additionally, SCI-1, or SCI-2, or both SCI-1 and SCI-2 may use the physical downlink control channel polar codes.

In some examples, a physical sidelink control channel duration may be configured to 2 or 3 symbols. Additionally or alternatively, physical sidelink control channel may be configured to span a quantity of physical resource blocks (e.g., 10, 12, 15, 20, or 25 physical resource blocks), for example in a single sub-channel. In some examples, a demodulation reference signal may be present in every physical sidelink control channel symbol and may be included in a subset of the resource element (e.g., every fourth resource element). In some examples, frequency domain orthogonal cover codes may be applied to demodulation reference signal to reduce impact of colliding physical sidelink control channel transmissions. In some instances, a transmitter UE may randomly select from a set of defined frequency domain orthogonal cover codes. In some instances, a starting symbol for physical sidelink control channel may be the second symbol in a slot (e.g., after a first symbol which is used for automatic gain control). In some examples, the physical sidelink control channel may be mapped to contiguous resource blocks in physical sidelink control channel starting from the first symbol with physical sidelink shared channel demodulation reference signal. In some examples, a physical sidelink control channel may be scrambled separately from sidelink shared channel. The physical sidelink control channel may use quadrature phase shift keying modulation and may not perform blind decoding. In some examples, SCI-2 format may be indicated in SCI-1. A UE may derive a number of resource elements from SCI-1 content. The UE may know a starting location when sidelink shared channel transmission is performed on two layers. In some examples, SCI-2 modulation symbols may be copied on both layers.

A remote UE that is connected to multiple relay UEs may receive data in the downlink (providing diversity or multiplexing gains). In some examples, both relay UEs may have a common source ID. In such cases, the physical sidelink shared channel from each relay UE, may be transmitted transparently to a receiver. In such an example, a receiver may observe two different channels (due to the fact that the two transmitters (e.g., the relay UEs) may not be quasi-colocated), and therefore, large scale properties tracking may be difficult for the remote UE. Aspects of the present disclosure provide for an association between physical sidelink shared channels and symbol periods for performing automatic gain control measurements to aid with tracking the large scale properties of each channel separately and achieve enhanced physical sidelink shared channel performance. In particular, aspects depicted herein provide methods for associating physical sidelink shared channel to a quasi-colocation (or transmission configuration indicator state), which may enable a receiver to maintain the large scale statistics of each channel and achieve a better demodulation performance.

According to one or more aspects of the present disclosure, a base station 105-*a* may signal relay operation to relay UEs and remote UEs in a multiple relay configuration using Mode 1 resource allocation or Mode 2 resource allocation. In some cases, either operation mode (e.g., Mode 1 or Mode 2) may support a transmission of single sidelink control information, or multiple sidelink control information. For transmissions associated with single sidelink control information, a first relay UE 115-*a* may transmit a physical sidelink shared channel 215 (in a first data region) and a physical sidelink control channel 225, while a second relay UE 115-*b* may transmit a physical sidelink shared channel 220 (in a second data region). That is, one relay UE may transmit a single sidelink control information and the control information, while both relay UEs may transmit data messages. In some cases, for single sidelink control information transmissions, the second relay UE 115-*b* may transmit the physical sidelink shared channel 220 and a physical sidelink control channel, while the first relay UE 115-*a* may transmit physical sidelink shared channel 215. For both single sidelink control information and multiple sidelink control information, transmissions may be spatial division multiplexed, time division multiplexed, or frequency division multiplexed, or use a combination of multiplexing schemes.

In some examples, physical sidelink shared channels may occupy the same time and/or frequency allocation with the single sidelink control information assigning different ports to different physical sidelink shared channels. In some examples, two or more physical sidelink shared channels may have the same time allocation but be frequency division multiplexed. The sidelink control information may assign, through a frequency domain resource allocation field, two frequency domain allocations to the physical sidelink shared channels. In some instances, two or more physical sidelink shared channels may be time division multiplexed on the same frequency allocation. A time domain resource allocation of the sidelink control information may be used to determine a receiver UE receiving a single physical sidelink control channel. For example, the physical sidelink control channel demodulation reference signal and physical sidelink control channel content may be transmitted from a single relay UE. In some examples, a receiver UE may determine (e.g., explicitly or implicitly) which of the multiple physical sidelink shared channels are quasi-colocated with the physical sidelink control channels.

In some instances, a remote UE 115-*d* may determine a quasi-colocation relationship based on an indication of such quasi-colocation relationship included in a physical sidelink control channel or a quasi-colocation relationship associated to a physical sidelink control channel. Additionally or alternatively, a physical sidelink control channel may include an ordering or mapping on how the automatic gain control symbols are mapped into the multiple scheduled physical sidelink shared channels. In some examples, if a physical sidelink control channel is frequency domain multiplexed with a first physical sidelink shared channel, then a remote UE 115-*d* may assume that the first physical sidelink shared channel is quasi-colocated with the physical sidelink control channel. In spatial domain multiplexing, the remote UE 115-*d* may identify that physical sidelink shared channel that occupies the ports with the smallest identifier is quasi-colocated with the physical sidelink control channel scheduling both physical sidelink shared channels. Thus, aspects of the present disclosure provides a quasi-colocation relationship between control regions and data regions, where the data is transmitted by a first relay UE and a second relay UE.

Figure 3:
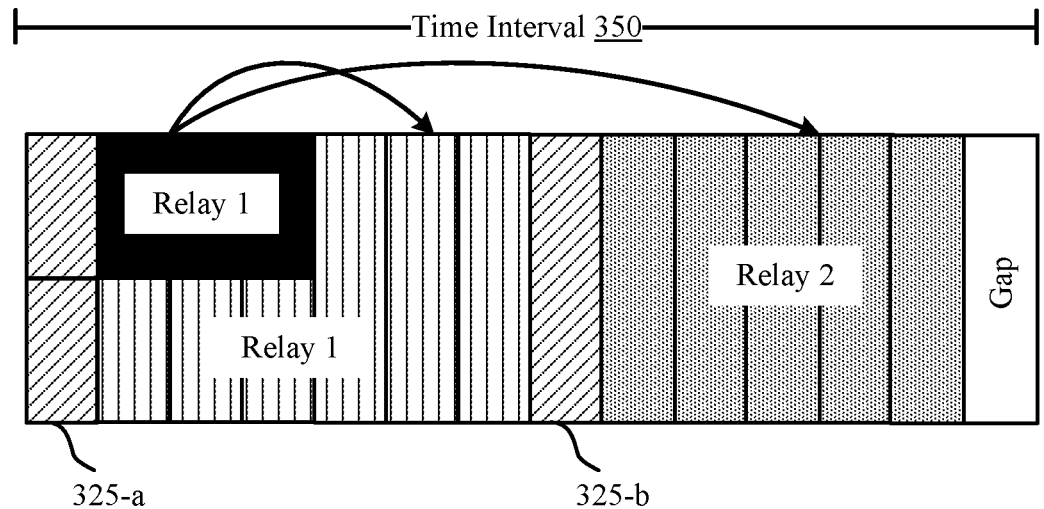
FIG. 3 illustrates an example of a resource allocation that supports quasi-colocation and automatic gain control determination for multi-relay sidelink communications in accordance with aspects of the present disclosure.

FIG. 3 illustrates an example of a resource allocation 300 that supports quasi-colocation and automatic gain control determination for multi-relay sidelink communications in accordance with aspects of the present disclosure. The resource allocation 300 may implement various aspects of the wireless communications system 100 or may be implemented by various aspects of the wireless communications system 100, among other examples. For example, the resource allocation 300 may be based on a configuration by a base station 105 and implemented by a UE 115. The resource allocation 300 may be used to determine quasi-colocation and automatic gain control to achieve greater reliability and lower latency operations in a wireless communications system. The resource allocation 300 may also be based on a configuration by the base station 105, and implemented by the UE 115 to decrease power consumption by the UE 115 while performing communication operations (e.g., relay transmissions), among other benefits.

In some examples, a base station 105 and UEs 115 (e.g., the relay UE 115-*a*, the relay UE 115-*b*, the relay UE 115-*c*, and the remote UE 115-*d*, as described with reference to FIG. 2) may utilize multiple path relaying between the relay UEs 115 and the remote UE 115 using Mode 1 resource allocation and Mode 2 resource allocation. In Mode 1 resource allocation and Mode 2 resource allocation, the base station 105 may indicate configurations for single sidelink control information or multiple sidelink control information operations to each relay UE 115 dynamically (e.g., via control information message) or semi-statically (e.g., using radio resource control signaling).

In the example illustrated in FIG. 3, the resource allocation 300 may include a slot including 14 symbol periods. Each symbol period may include time resources (e.g., symbols, minislots, slots, subframes, or a frame) as well as frequency resources (e.g., carriers, subcarriers, bands, bandwidth parts, resource blocks, or other groupings of subcarriers). A combination of a time resource, such as a symbol, and a frequency resource, such as a subcarrier, may define an associated resource element. According to one or more aspects of the present disclosure, a remote UE 115 may receive an indication of a quasi-colocation relationship between the one or more control regions of a time interval and a set of data regions of the time interval for communications via the set of relay UEs.

In the example illustrated in FIG. 3, the remote UE 115 may identify a quasi-colocation relationship between one or more control regions of resources during a time interval 350 and a set of data regions of the resources during the time interval 350 for communications via a set of relay UEs (e.g., a first relay UE and a second relay UE). In some examples, the set of data regions may include at least a first data region for the first relay UE of the set of relay UEs and a second data region for the second relay UE of the set of relay UEs. As depicted in FIG. 3, the time interval 350 includes a control region 315 including physical sidelink control channel from the first relay UE (spanning 3 symbols). The time interval 350 further includes a first data region 305 including physical sidelink shared channel from the first relay UE and a second data region 310 including physical sidelink shared channel from the second relay UE. The time interval 350 also includes a gap symbol 320.

The remote UE 115 may identify, according to the quasi-colocation relationship, one or more symbol periods of the time interval 350 for one or more automatic gain control measurements for the one or more control regions and the set of data regions. As depicted in the example of FIG. 3, the remote UE identifies, according to the quasi-colocation relationship, a first symbol period 325-a preceding the first data region 305 for the first relay UE and a second symbol period 325-b preceding the second data region 310 for the second relay UE for the one or more automatic gain control measurements. That is, the remote UE 115 identifies two symbols for performing automatic gain control measurement in the time interval 350. The remote UE 115 may then perform the one or more automatic gain control measurements on the identified symbols. For instance, the remote UE 115 may perform an automatic gain control measurement on the signals received in the first symbol period 325-a and the second symbol period 325-b. The UE 115 may receive, based on the one or more automatic gain control measurements, a first data message from the first relay UE in the first data region 305 and a second data message from the second relay UE in the second data region 310.

Figure 4:
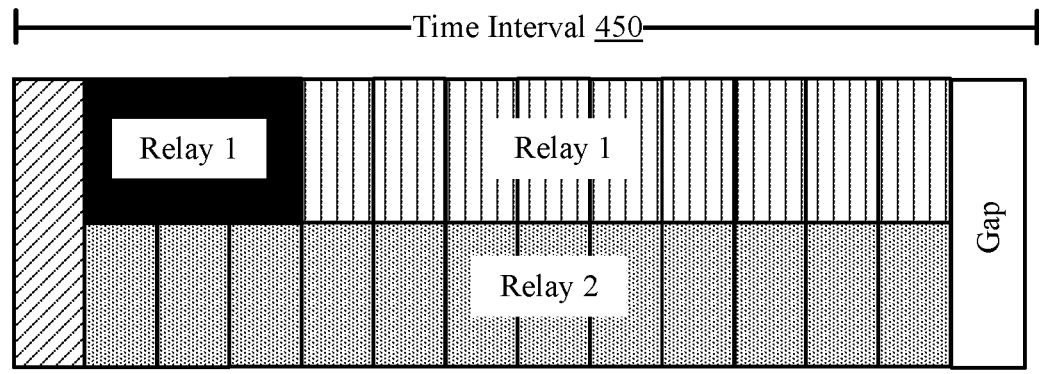
FIG. 4 illustrates an example of a resource allocation that supports quasi-colocation and automatic gain control determination for multi-relay sidelink communications in accordance with aspects of the present disclosure.

FIG. 4 illustrates an example of a resource allocation 400 that supports quasi-colocation and automatic gain control determination for multi-relay sidelink communications in accordance with aspects of the present disclosure. The resource allocation 400 may implement various aspects of the wireless communications system 100 or may be implemented by various aspects of the wireless communications system 100, among other examples. For example, the resource allocation 400 may be based on a configuration by a base station 105 and implemented by a UE 115. The resource allocation 400 may be used to determine quasi-colocation and automatic gain control to achieve greater reliability and lower latency operations in a wireless communications system. The resource allocation 400 may also be based on a configuration by the base station 105, and implemented by the UE 115 to decrease power consumption by the UE 115 while performing communication operations (e.g., relay transmissions), among other benefits.

In some examples, a base station 105 and UEs 115 (e.g., the relay UE 115-a, the relay UE 115-b, the relay UE 115-c, and the remote UE 115-d, as described with reference to FIG. 2) may utilize multiple path relaying between the relay UEs 115 and the remote UE 115 using Mode 1 resource allocation and Mode 2 resource allocation. In Mode 1 resource allocation and Mode 2 resource allocation, the base station 105 may indicate configurations for single sidelink control information or multiple sidelink control information operations to each relay UE 115 dynamically (e.g., via control information message) or semi-statically (e.g., using radio resource control signaling).

In the example illustrated in FIG. 4, the resource allocation 400 may include a slot including 14 symbol periods. Each symbol period may include time resources (e.g., symbols, minislots, slots, subframes, or a frame) as well as frequency resources (e.g., carriers, subcarriers, bands, bandwidth parts, resource blocks, or other groupings of subcarriers). A combination of a time resource, such as a symbol, and a frequency resource, such as a subcarrier, may define an associated resource element. According to one or more aspects of the present disclosure, a remote UE 115 may receive an indication of a quasi-colocation relationship between the one or more control regions of a time interval and a set of data regions of the time interval for communications via the set of relay UEs.

In the example illustrated in FIG. 4, the remote UE 115 may identify a quasi-colocation relationship between one or more control regions of resources during a time interval 450 and a set of data regions of the resources during the time interval 450 for communications via a set of relay UEs (e.g., a first relay UE and a second relay UE). In some examples, the set of data regions may include at least a first data region 405 for the first relay UE of the set of relay UEs and a second data region 410 for the second relay UE of the set of relay UEs. As depicted in FIG. 4, the time interval 450 includes a control region 415 including physical sidelink control channel from the first relay UE (spanning 3 symbols). The time interval 450 further includes a first data region 405 including physical sidelink shared channel from the first relay UE and a second data region 410 including physical sidelink shared channel from the second relay UE. The time interval 450 also includes a gap symbol 420. The time interval 450 includes the first data region 405 frequency division multiplexed with the second data region 410. In some examples, the remote UE 115 may be provided an explicit signaling or an implicit signaling indicating that a physical sidelink shared channel quasi-colocated with a physical sidelink control channel. Additionally or alternatively, the remote UE may identify a mapping from a quasi-colocation parameter being tracked to a physical sidelink control channel.

According to one or more aspects, the remote UE 115 may identify, according to the quasi-colocation relationship, one or more symbol periods of the time interval 450 for one or more automatic gain control measurements for the one or more control regions and the set of data regions. As depicted in the example of FIG. 4, the remote UE identifies, according to the quasi-colocation relationship, a symbol period 425 preceding a control region 415 of the one or more control regions and the second data region 410 for the second relay UE for the one or more automatic gain control measurements. That is, the remote UE 115 identifies a symbol period 425 for performing automatic gain control measurement in the time interval 450. The remote UE 115 may then perform the one or more automatic gain control measurements on the identified symbol period 425. For instance, the remote UE 115 may perform an automatic gain control measurement on the signals received in the identified symbol period 425. The UE 115 may receive, based on the one or more automatic gain control measurements, a first data message from the first relay UE in the first data region 405 and a second data message from the second relay UE in the second data region 410.

Figure 5:
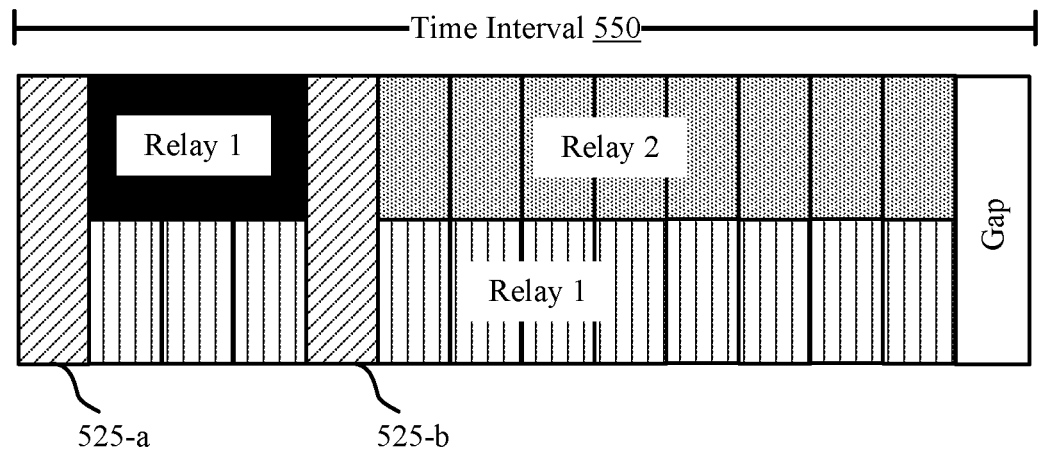
FIG. 5 illustrates an example of a resource allocation that supports quasi-colocation and automatic gain control determination for multi-relay sidelink communications in accordance with aspects of the present disclosure.

FIG. 5 illustrates an example of a resource allocation 500 that supports quasi-colocation and automatic gain control determination for multi-relay sidelink communications in accordance with aspects of the present disclosure. The resource allocation 500 may implement various aspects of the wireless communications system 100 or may be implemented by various aspects of the wireless communications system 100, among other examples. For example, the resource allocation 500 may be based on a configuration by a base station 105 and implemented by a UE 115. The resource allocation 500 may be used to determine quasi-colocation and automatic gain control to achieve greater reliability and lower latency operations in a wireless communications system. The resource allocation 500 may also be based on a configuration by the base station 105, and implemented by the UE 115 to decrease power consumption by the UE 115 while performing communication operations (e.g., relay transmissions), among other benefits.

In some examples, a base station 105 and UEs 115 (e.g., the relay UE 115-a, the relay UE 115-b, the relay UE 115-c, and the remote UE 115-d, as described with reference to FIG. 2) may utilize multiple path relaying between the relay UEs 115 and the remote UE 115 using Mode 1 resource allocation and Mode 2 resource allocation. In Mode 1 resource allocation and Mode 2 resource allocation, the base station 105 may indicate configurations for single sidelink control information or multiple sidelink control information operations to each relay UE 115 dynamically (e.g., via control information message) or semi-statically (e.g., using radio resource control signaling).

In the example illustrated in FIG. 5, the resource allocation 500 may include a slot including 14 symbol periods. Each symbol period may include time resources (e.g., symbols, minislots, slots, subframes, or a frame) as well as frequency resources (e.g., carriers, subcarriers, bands, bandwidth parts, resource blocks, or other groupings of subcarriers). A combination of a time resource, such as a symbol, and a frequency resource, such as a subcarrier, may define an associated resource element. According to one or more aspects of the present disclosure, a remote UE 115 may receive an indication of a quasi-colocation relationship between the one or more control regions of a time interval and a set of data regions of the time interval for communications via the set of relay UEs.

In the example illustrated in FIG. 5, the remote UE 115 may identify a quasi-colocation relationship between one or more control regions of resources during a time interval 550 and a set of data regions of the resources during the time interval 550 for communications via a set of relay UEs (e.g., a first relay UE and a second relay UE). In some examples, the set of data regions may include at least a first data region 505 for the first relay UE of the set of relay UEs and a second data region 510 for the second relay UE of the set of relay UEs. As depicted in FIG. 5, the time interval 550 includes a control region 515 including physical sidelink control channel from the first relay UE (spanning 3 symbols). The time interval 550 further includes a first data region 505 including physical sidelink shared channel from the first relay UE and a second data region 510 including physical sidelink shared channel from the second relay UE. The time interval 550 also includes a gap symbol 520. The time interval 550 includes the first data region 505 frequency division multiplexed with the second data region 510. The second data region 510 is time division multiplexed with the control region 515.

According to one or more aspects, the remote UE 115 may identify, according to the quasi-colocation relationship, one or more symbol periods of the time interval 550 for one or more automatic gain control measurements for the one or more control regions and the set of data regions. As depicted in the example of FIG. 5, the remote UE 115 identifies, according to the quasi-colocation relationship, a first symbol period 525-a preceding the control region 515 of and the first data region 505 for the first relay UE for the one or more automatic gain control measurements. The remote UE 115 also identifies, according to the quasi-colocation relationship, a second symbol period 525-b preceding the second data region 510 for the second relay UE for the one or more automatic gain control measurements. That is, the remote UE 115 identifies a first symbol period 525-a and a second symbol period 525-b for performing automatic gain control measurement in the time interval 550. The remote UE 115 may then perform the one or more automatic gain control measurements on the first symbol period 525-a and the second symbol period 525-b. For instance, the remote UE 115 may perform an automatic gain control measurement on the signals received in the first symbol period 525-a and the second symbol period 525-b. The UE 115 may receive, based on the one or more automatic gain control measurements, a first data message from the first relay UE in the first data region 505 and a second data message from the second relay UE in the second data region 510.

Figure 6:
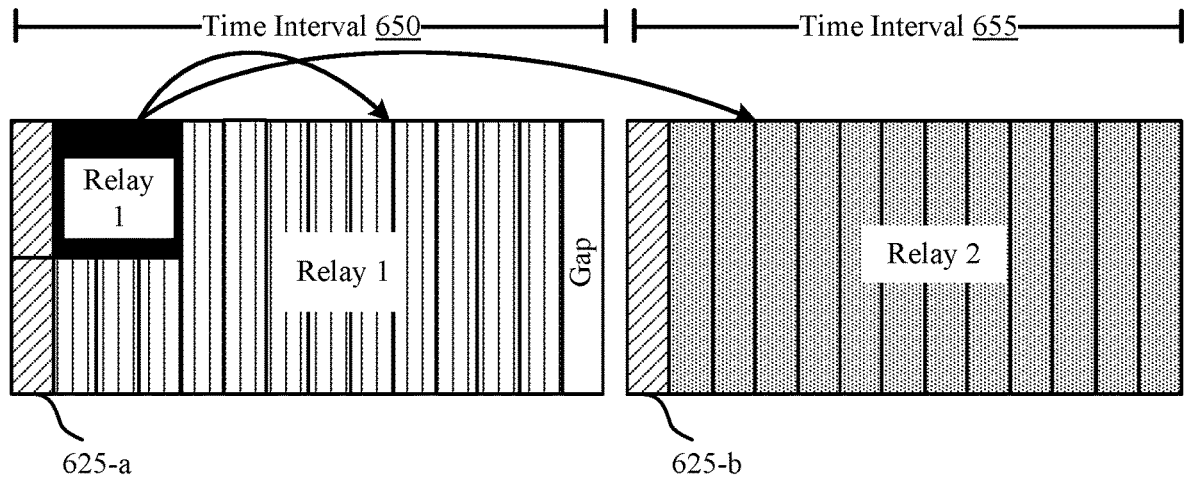
FIG. 6 illustrates an example of a resource allocation that supports quasi-colocation and automatic gain control determination for multi-relay sidelink communications in accordance with aspects of the present disclosure.

FIG. 6 illustrates an example of a resource allocation 600 that supports quasi-colocation and automatic gain control determination for multi-relay sidelink communications in accordance with aspects of the present disclosure. The resource allocation 600 may implement various aspects of the wireless communications system 100 or may be implemented by various aspects of the wireless communications system 100, among other examples. For example, the resource allocation 600 may be based on a configuration by a base station 105 and implemented by a UE 115. The resource allocation 600 may be used to determine quasi-colocation and automatic gain control to achieve greater reliability and lower latency operations in a wireless communications system. The resource allocation 600 may also be based on a configuration by the base station 105, and implemented by the UE 115 to decrease power consumption by the UE 115 while performing communication operations (e.g., relay transmissions), among other benefits.

In some examples, a base station 105 and UEs 115 (e.g., the relay UE 115-a, the relay UE 115-b, the relay UE 115-c, and the remote UE 115-d, as described with reference to FIG. 2) may utilize multiple path relaying between the relay UEs 115 and the remote UE 115 using Mode 1 resource allocation and Mode 2 resource allocation. In Mode 1 resource allocation and Mode 2 resource allocation, the base station 105 may indicate configurations for single sidelink control information or multiple sidelink control information operations to each relay UE 115 dynamically (e.g., via control information message) or semi-statically (e.g., using radio resource control signaling).

In the example illustrated in FIG. 6, the resource allocation 600 may include two slots, each slot including a number of symbol periods. Each symbol period may include time resources (e.g., symbols, minislots, slots, subframes, or a frame) as well as frequency resources (e.g., carriers, subcarriers, bands, bandwidth parts, resource blocks, or other groupings of subcarriers). A combination of a time resource, such as a symbol, and a frequency resource, such as a subcarrier, may define an associated resource element. According to one or more aspects of the present disclosure, a remote UE 115 may receive an indication of a quasi-colocation relationship between the one or more control regions of a time interval and a set of data regions of the time interval for communications via the set of relay UEs. In the example of FIG. 6, the time interval may include a first time interval 650 and a second time interval 655.

In the example illustrated in FIG. 6, the remote UE 115 may identify a quasi-colocation relationship between one or more control regions of resources during a first time interval 650 and a set of data regions of the resources during the first time interval 650 and a second time interval 655 for communications via a set of relay UEs (e.g., a first relay UE and a second relay UE). In some examples, the set of data regions may include at least a first data region for the first relay UE of the set of relay UEs and a second data region for the second relay UE of the set of relay UEs. As depicted in FIG. 6, the time interval 350 includes a control region 615 including physical sidelink control channel from the first relay UE (spanning 3 symbols). The first time interval 650 further includes a first data region 605 including physical sidelink shared channel from the first relay UE and a second data region 610 including physical sidelink shared channel from the second relay UE. The first time interval 650 also includes a gap symbol 620.

The remote UE 115 may identify, according to the quasi-colocation relationship, one or more symbol periods of the first time interval 650 and the second time interval 655 for one or more automatic gain control measurements for the one or more control regions and the set of data regions. As depicted in the example of FIG. 6, the remote UE 115 identifies, according to the quasi-colocation relationship, a first symbol period 625-*a* preceding a control region 615 of the one or more control regions and the first data region 605 for the first relay UE for the one or more automatic gain control measurements. In some examples, the control region and the first data region are included in a first slot (e.g., the first time interval 650). Additionally, the remote UE 115 identifies, according to the quasi-colocation relationship, a second symbol period 625-*b* preceding the second data region 610 for the second relay UE for the one or more automatic gain control measurements. As depicted herein, the second data region is included in a second slot (e.g., the second time interval 655). That is, the remote UE 115 identifies two symbols for performing automatic gain control measurement in the first time interval 650 and the second time interval 655. The remote UE 115 may then perform the one or more automatic gain control measurements on the identified symbols. For instance, the remote UE 115 may perform an automatic gain control measurement on the signals received in the first symbol period 625-*a* and the second symbol period 625-*b*.

The UE 115 may receive, based on the one or more automatic gain control measurements, a first data message from the first relay UE in the first data region 605 and a second data message from the second relay UE in the second data region 610. In some examples, the remote UE 115 may transmit an indication of a capability of the remote UE 115 to track simultaneously at least two sidelink quasi-colocation parameters. As depicted in the example of FIG. 6, a single physical sidelink control channel (e.g., control region 615) schedules two physical sidelink shared channels (e.g., first data region 605 and second data region 610). The remote UE 115 may be aware through signaling in physical sidelink control channel (e.g., SCI-2) or an implicit ordering (e.g., the physical sidelink shared channel in the same slot as the physical sidelink control channel are assumed to be quasi-colocated). In some examples, the remote UE 115 having a capability to track two sidelink quasi-colocation parameters, is able to map the trained or tracked quasi-colocation properties to the corresponding physical sidelink shared channel for improved demodulation performance.

Figure 7:
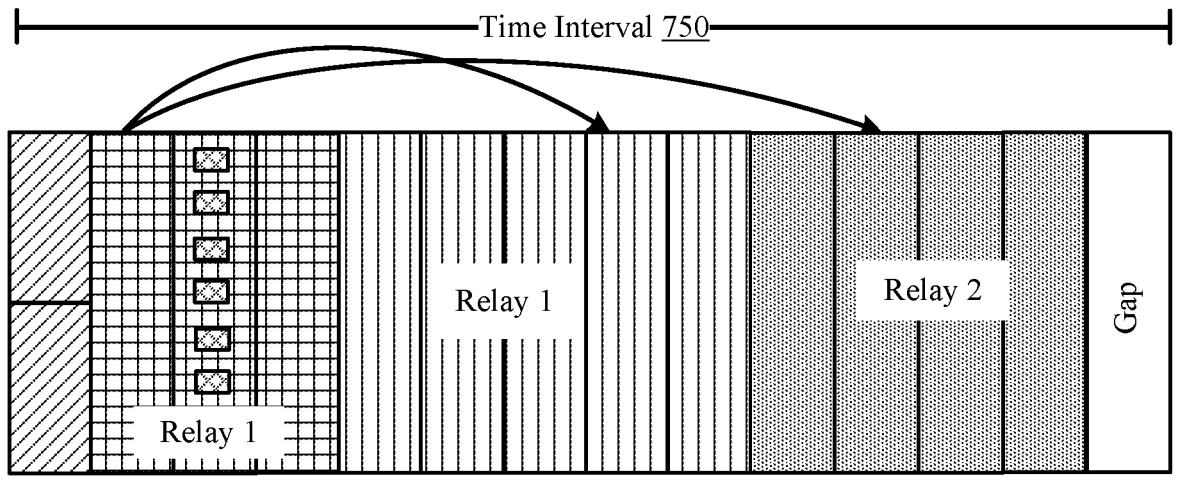
FIG. 7 illustrates an example of a resource allocation that supports quasi-colocation and automatic gain control determination for multi-relay sidelink communications in accordance with aspects of the present disclosure.

FIG. 7 illustrates an example of a resource allocation 700 that supports quasi-colocation and automatic gain control determination for multi-relay sidelink communications in accordance with aspects of the present disclosure. The resource allocation 700 may implement various aspects of the wireless communications system 100 or may be implemented by various aspects of the wireless communications system 100, among other examples. For example, the resource allocation 700 may be based on a configuration by a base station 105 and implemented by a UE 115. The resource allocation 700 may be used to determine quasi-colocation and automatic gain control to achieve greater reliability and lower latency operations in a wireless communications system. The resource allocation 700 may also be based on a configuration by the base station 105, and implemented by the UE 115 to decrease power consumption by the UE 115 while performing communication operations (e.g., relay transmissions), among other benefits.

In some examples, a base station 105 and UEs 115 (e.g., the relay UE 115-*a*, the relay UE 115-*b*, the relay UE 115-*c*, and the remote UE 115-*d*, as described with reference to FIG. 2) may utilize multiple path relaying between the relay UEs 115 and the remote UE 115 using Mode 1 resource allocation and Mode 2 resource allocation. In Mode 1 resource allocation and Mode 2 resource allocation, the base station 105 may indicate configurations for single sidelink control information or multiple sidelink control information operations to each relay UE 115 dynamically (e.g., via control information message) or semi-statically (e.g., using radio resource control signaling).

In the example illustrated in FIG. 7, the resource allocation 700 may include a slot including 14 symbol periods. Each symbol period may include time resources (e.g., symbols, minislots, slots, subframes, or a frame) as well as frequency resources (e.g., carriers, subcarriers, bands, bandwidth parts, resource blocks, or other groupings of subcarriers). A combination of a time resource, such as a symbol, and a frequency resource, such as a subcarrier, may define an associated resource element. According to one or more aspects of the present disclosure, a remote UE 115 may receive an indication of a quasi-colocation relationship between the one or more control regions of a time interval and a set of data regions of the time interval for communications via the set of relay UEs.

In some examples, the set of data regions may include at least a first data region 705 for the first relay UE of the set of relay UEs and a second data region 710 for the second relay UE of the set of relay UEs. As depicted in FIG. 7, the time interval 750 includes a first control region 715 including physical sidelink control channel from the first relay UE (e.g., spanning 3 symbols). The time interval 750 further includes a first data region 705 including physical sidelink shared channel from the first relay UE and a second data region 710 including physical sidelink shared channel from the second relay UE. The time interval 750 also includes a gap symbol 720.

The remote UE 115 may identify, according to the quasi-colocation relationship, one or more symbol periods of the time interval 750 for one or more automatic gain control measurements for the one or more control regions and the set of data regions. In the example illustrated in FIG. 7, the remote UE 115 may identify a quasi-colocation relationship between one or more control regions of resources during a time interval 750 and a set of data regions of the resources during the time interval 750 for communications via a set of relay UEs (e.g., a first relay UE and a second relay UE). As depicted in the example of FIG. 7, the remote UE 115 may identify the quasi-colocation relationship between a first control region 715 of the one or more control regions and the first data region 705, and between one or more reference signals 730 in the first control region 715 and the second data region 710. In some examples, reference signals 730 may be demodulation reference signals, though other reference signal types and/or sequences may be used in other examples. Thus, in the first control region 715 carrying a physical sidelink control channel, a remote UE 115 can be configured to monitor for single physical sidelink control channel which includes reference signals 730 associated with the second physical sidelink shared channel (or second data region 710). Thus, the remote UE 115 may use the reference signals to learn or track the quasi-colocation properties for the second physical sidelink shared channel.

As depicted in the example of FIG. 7, the remote UE identifies, according to the quasi-colocation relationship, a symbol period 725 preceding the first control region 715 including the one or more reference signals 730 for the one or more automatic gain control measurements. That is, the remote UE 115 identifies a symbol for performing automatic gain control measurement in the time interval 750. The remote UE 115 may then perform the one or more automatic gain control measurements on the identified symbol period 725. For instance, the remote UE 115 may perform an automatic gain control measurement on the signals received in the symbol period 725 and may receive, based on the one or more automatic gain control measurements, a first data message from the first relay UE in the first data region 705 and a second data message from the second relay UE in the second data region 710.

Figure 8:
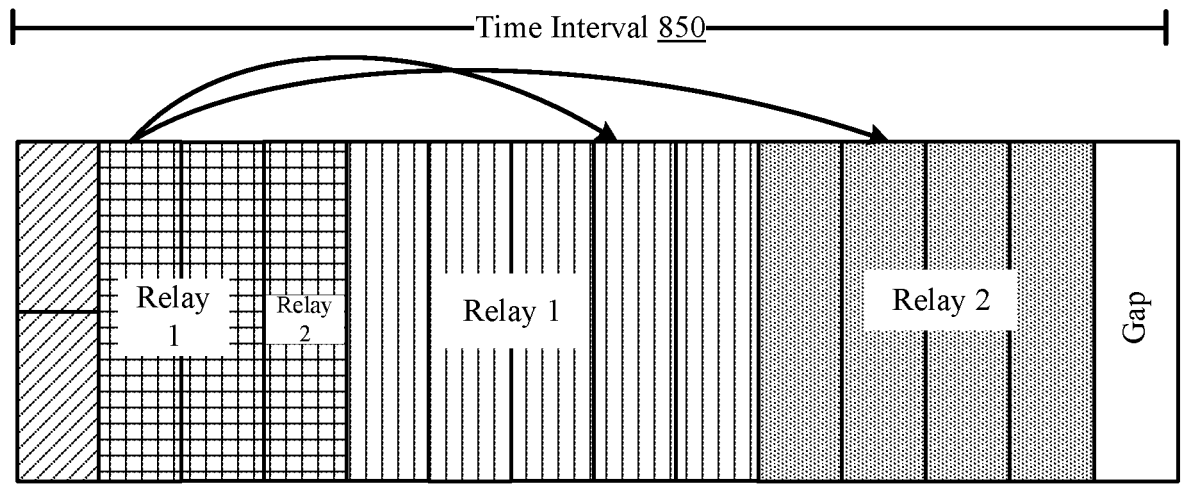
FIG. 8 illustrates an example of a resource allocation that supports quasi-colocation and automatic gain control determination for multi-relay sidelink communications in accordance with aspects of the present disclosure.

FIG. 8 illustrates an example of a resource allocation 800 that supports quasi-colocation and automatic gain control determination for multi-relay sidelink communications in accordance with aspects of the present disclosure. The resource allocation 800 may implement various aspects of the wireless communications system 100 or may be implemented by various aspects of the wireless communications system 100, among other examples. For example, the resource allocation 800 may be based on a configuration by a base station 105 and implemented by a UE 115. The resource allocation 800 may be used to determine quasi-colocation and automatic gain control to achieve greater reliability and lower latency operations in a wireless communications system. The resource allocation 800 may also be based on a configuration by the base station 105, and implemented by the UE 115 to decrease power consumption by the UE 115 while performing communication operations (e.g., relay transmissions), among other benefits.

In some examples, a base station 105 and UEs 115 (e.g., the relay UE 115-a, the relay UE 115-b, the relay UE 115-c, and the remote UE 115-d, as described with reference to FIG. 2) may utilize multiple path relaying between the relay UEs 115 and the remote UE 115 using Mode 1 resource allocation and Mode 2 resource allocation. In Mode 1 resource allocation and Mode 2 resource allocation, the base station 105 may indicate configurations for single sidelink control information or multiple sidelink control information operations to each relay UE 115 dynamically (e.g., via control information message) or semi-statically (e.g., using radio resource control signaling).

In the example illustrated in FIG. 8, the resource allocation 800 may include a slot including 14 symbol periods. Each symbol period may include time resources (e.g., symbols, minislots, slots, subframes, or a frame) as well as frequency resources (e.g., carriers, subcarriers, bands, bandwidth parts, resource blocks, or other groupings of subcarriers). A combination of a time resource, such as a symbol, and a frequency resource, such as a subcarrier, may define an associated resource element. According to one or more aspects of the present disclosure, a remote UE 115 may receive an indication of a quasi-colocation relationship between the one or more control regions of a time interval and a set of data regions of the time interval for communications via the set of relay UEs.

In some examples, the set of data regions may include at least a first data region 805 for the first relay UE of the set of relay UEs and a second data region 810 for the second relay UE of the set of relay UEs. As depicted in FIG. 8, the time interval 850 includes a first control region 815 including physical sidelink control channel from the first relay UE (spanning 2 symbols) and a second control region 830 including physical sidelink control channel from the second relay UE (spanning 1 symbol). The time interval 850 further includes a first data region 805 including physical sidelink shared channel from the first relay UE and a second data region 810 including physical sidelink shared channel from the second relay UE. The time interval 850 also includes a gap symbol 820.

The remote UE 115 may identify, according to the quasi-colocation relationship, one or more symbol periods of the time interval 850 for one or more automatic gain control measurements for the one or more control regions and the set of data regions. The remote UE 115 may perform a channel state information measurement to calculate a relative power offset between the first data region 805 for the first relay UE and the second data region 810 for the second relay UE. In the example illustrated in FIG. 8, the remote UE 115 may identify a quasi-colocation relationship between one or more control regions of resources during a time interval 850 and a set of data regions of the resources during the time interval 850 for communications via a set of relay UEs (e.g., a first relay UE and a second relay UE). In particular, the remote UE 115 may identify, according to the quasi-colocation relationship, a symbol period 825 preceding the first control region 815 of the one or more control regions for the one or more automatic gain control measurements. Thus, in a physical sidelink control channel region, the remote UE 115 can be configured to monitor for multiple physical sidelink control channels (e.g., first control region 815 and second control region 830); potentially from a different relay. As depicted herein, the physical sidelink shared channel regions are time domain multiplexed. In such examples, each physical sidelink control channel may be assumed to be quasi-colocated with a respective physical sidelink shared channel. In some examples, the remote UE 115 may assume a single slot for automatic gain control measurement. The remote UE 115 may be aware (through channel state information measurements perform on respective channel state information reference signal resources) of a relative offset between the two data channels. In some examples, the remote UE 115 may perform measurement based on the first physical sidelink control channel (associated with the first relay UE) and uses the offset to determine the automatic gain control measurement for the second physical sidelink control channel (associated with the second relay UE) and a corresponding physical sidelink shared channel.

As depicted in the example of FIG. 8, the remote UE 115 may identify the quasi-colocation relationship between a symbol period 825 preceding the first control region 815 of the one or more control regions for the one or more automatic gain control measurements. That is, the remote ULE 115 identifies a symbol for performing automatic gain control measurement in the time interval 850. The remote UE 115 may then perform the one or more automatic gain control measurements on the identified symbol period 825. For instance, the remote UE 115 may perform an automatic gain control measurement on the signals received in the symbol period 825 and may receive, based on the one or more automatic gain control measurements, a first data message from the first relay UE in the first data region 805 and a second data message from the second relay UE in the second data region 810.

Figure 9:
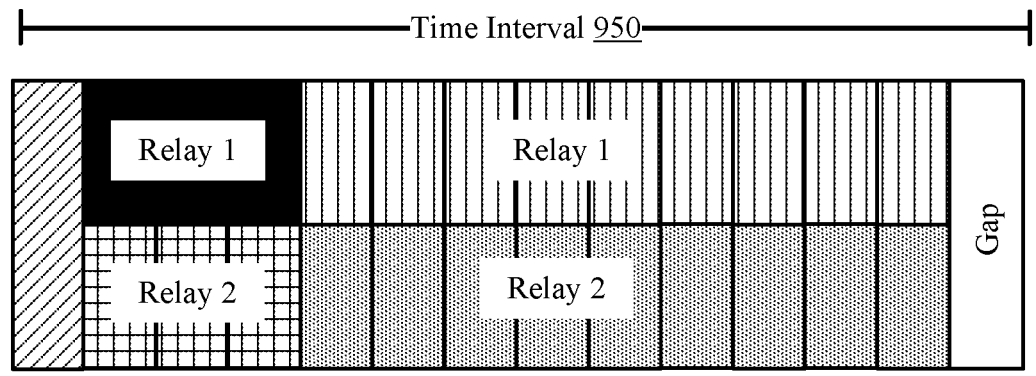
FIG. 9 illustrates an example of a resource allocation that supports quasi-colocation and automatic gain control determination for multi-relay sidelink communications in accordance with aspects of the present disclosure.

FIG. 9 illustrates an example of a resource allocation 900 that supports quasi-colocation and automatic gain control determination for multi-relay sidelink communications in accordance with aspects of the present disclosure. The resource allocation 900 may implement various aspects of the wireless communications system 100 or may be implemented by various aspects of the wireless communications system 100, among other examples. For example, the resource allocation 900 may be based on a configuration by a base station 105 and implemented by a UE 115. The resource allocation 900 may be used to determine quasi-colocation and automatic gain control to achieve greater reliability and lower latency operations in a wireless communications system. The resource allocation 900 may also be based on a configuration by the base station 105, and implemented by the UE 115 to decrease power consumption by the UE 115 while performing communication operations (e.g., relay transmissions), among other benefits.

In some examples, a base station 105 and UEs 115 (e.g., the relay UE 115-*a*, the relay UE 115-*b*, the relay UE 115-*c*, and the remote UE 115-*d*, as described with reference to FIG. 2) may utilize multiple path relaying between the relay UEs 115 and the remote UE 115 using Mode 1 resource allocation and Mode 2 resource allocation. In Mode 1 resource allocation and Mode 2 resource allocation, the base station 105 may indicate configurations for single sidelink control information or multiple sidelink control information operations to each relay UE 115 dynamically (e.g., via control information message) or semi-statically (e.g., using radio resource control signaling).

In the example illustrated in FIG. 9, the resource allocation 900 may include a slot including 14 symbol periods. Each symbol period may include time resources (e.g., symbols, minislots, slots, subframes, or a frame) as well as frequency resources (e.g., carriers, subcarriers, bands, bandwidth parts, resource blocks, or other groupings of subcarriers). A combination of a time resource, such as a symbol, and a frequency resource, such as a subcarrier, may define an associated resource element. According to one or more aspects of the present disclosure, a remote UE 115 may receive an indication of a quasi-colocation relationship between the one or more control regions of a time interval and a set of data regions of the time interval for communications via the set of relay UEs.

In the example illustrated in FIG. 9, the remote UE 115 may identify a quasi-colocation relationship between one or more control regions of resources during a time interval 950 and a set of data regions of the resources during the time interval 950 for communications via a set of relay UEs (e.g., a first relay UE and a second relay UE). In some examples, the set of data regions may include at least a first data region 905 for the first relay UE of the set of relay UEs and a second data region 910 for the second relay UE of the set of relay UEs. As depicted in FIG. 9, the time interval 950 includes a first control region 915 including physical sidelink control channel from the first relay UE (spanning 3 symbols) frequency domain multiplexed with a second control region 930 including physical sidelink control channel from the second relay UE (spanning 3 symbols). The time interval 950 further includes a first data region 905 including physical sidelink shared channel from the first relay UE and a second data region 910 including physical sidelink shared channel from the second relay UE. As depicted herein, the first data region 905 is frequency division multiplexed with the second data region 910. The time interval 950 also includes a gap symbol 920.

In the example of FIG. 9, two physical sidelink control channels may schedule the respective physical sidelink shared channels (where each physical sidelink control channel is quasi-colocated with a correspond physical sidelink shared channel), such that the physical resource blocks occupied for the "ith" physical sidelink control channel and physical sidelink shared channels are assumed to be the same. That way, a remote UE 115 may use a symbol period 925 to calculate a reliable estimate of a receiver power (if the frequency allocation was changing in later symbols, then the overall received power may change). According to one or more aspects, the remote UE 115 may identify, according to the quasi-colocation relationship, one or more symbol periods of the time interval 950 for one or more automatic gain control measurements for the one or more control regions and the set of data regions. As depicted in the example of FIG. 9, the remote UE identifies, according to the quasi-colocation relationship, a symbol period 925 preceding a first control region 915 of the one or more control regions and a second control region 930 of the one or more control regions for the one or more automatic gain control measurements. The remote UE 115 may then perform the one or more automatic gain control measurements on the identified symbol period 925. For instance, the remote UE 115 may perform an automatic gain control measurement on the signals received in the identified symbol period 925. The UE 115 may receive, based on the one or more automatic gain control measurements, a first data message from the first relay UE in the first data region 905 and a second data message from the second relay UE in the second data region 910.

Figure 10:
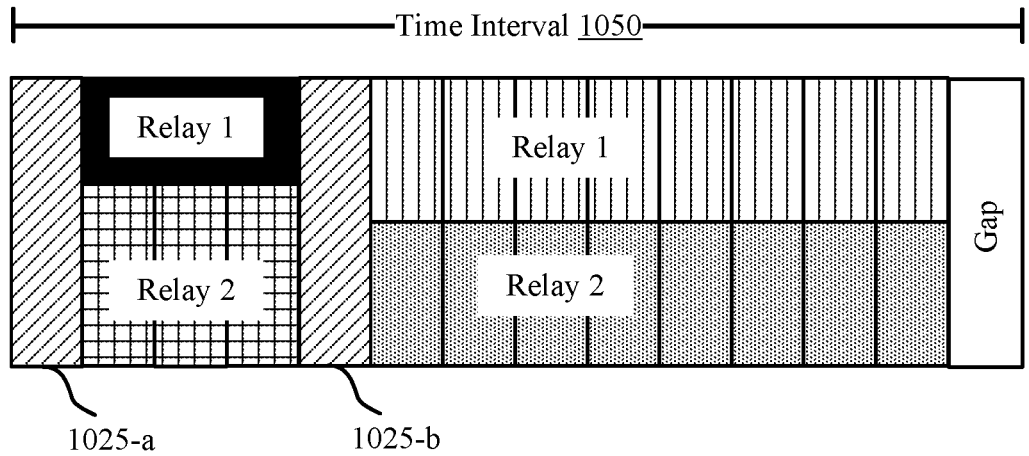
FIG. 10 illustrates an example of a resource allocation that supports quasi-colocation and automatic gain control determination for multi-relay sidelink communications in accordance with aspects of the present disclosure.
Figure 10:
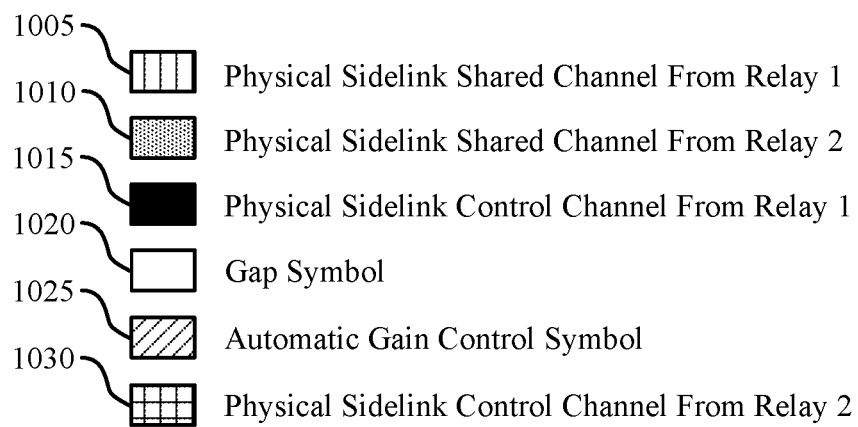

FIG. 10 illustrates an example of a resource allocation 1000 that supports quasi-colocation and automatic gain control determination for multi-relay sidelink communications in accordance with aspects of the present disclosure. The resource allocation 1000 may implement various aspects of the wireless communications system 100 or may be implemented by various aspects of the wireless communications system 100, among other examples. For example, the resource allocation 1000 may be based on a configuration by a base station 105 and implemented by a UE 115. The resource allocation 1000 may be used to determine quasi-colocation and automatic gain control to achieve greater reliability and lower latency operations in a wireless communications system. The resource allocation 1000 may also be based on a configuration by the base station 105, and implemented by the UE 115 to decrease power consumption by the UE 115 while performing communication operations (e.g., relay transmissions), among other benefits.

In some examples, a base station 105 and UEs 115 (e.g., the relay UE 115-*a*, the relay UE 115-*b*, the relay UE 115-*c*, and the remote UE 115-*d*, as described with reference to FIG. 2) may utilize multiple path relaying between the relay UEs 115 and the remote UE 115 using Mode 1 resource allocation and Mode 2 resource allocation. In Mode 1 resource allocation and Mode 2 resource allocation, the base station 105 may indicate configurations for single sidelink control information or multiple sidelink control information operations to each relay UE 115 dynamically (e.g., via control information message) or semi-statically (e.g., using radio resource control signaling).

In the example illustrated in FIG. 10, the resource allocation 1000 may include a slot including 14 symbol periods. Each symbol period may include time resources (e.g., symbols, minislots, slots, subframes, or a frame) as well as frequency resources (e.g., carriers, subcarriers, bands, bandwidth parts, resource blocks, or other groupings of subcarriers). A combination of a time resource, such as a symbol, and a frequency resource, such as a subcarrier, may define an associated resource element. According to one or more aspects of the present disclosure, a remote UE 115 may receive an indication of a quasi-colocation relationship between the one or more control regions of a time interval and a set of data regions of the time interval for communications via the set of relay UEs.

In the example illustrated in FIG. 10, the remote UE 115 may identify a quasi-colocation relationship between one or more control regions of resources during a time interval 1050 and a set of data regions of the resources during the time interval 1050 for communications via a set of relay UEs (e.g., a first relay UE and a second relay UE). In some examples, the set of data regions may include at least a first data region 1005 for the first relay UE of the set of relay UEs and a second data region 1010 for the second relay UE of the set of relay UEs. As depicted in FIG. 10, the time interval 1050 includes a first control region 1015 including physical sidelink control channel from the first relay UE (spanning 3 symbols) frequency domain multiplexed with a second control region 1030 including physical sidelink control channel from the second relay UE (spanning 3 symbols). The time interval 1050 further includes a first data region 1005 including physical sidelink shared channel from the first relay UE and a second data region 1010 including physical sidelink shared channel from the second relay UE. As depicted herein, the first data region 1005 is frequency division multiplexed with the second data region 1010. The time interval 1050 also includes a gap symbol 1020.

According to one or more aspects, the remote UE 115 may identify, according to the quasi-colocation relationship, one or more symbol periods of the time interval 1050 for one or more automatic gain control measurements for the one or more control regions and the set of data regions. As depicted in the example of FIG. 10, the remote UE identifies, according to the quasi-colocation relationship, a first symbol period 1025-*a* preceding a first control region 1015 of the one or more control regions and a second control region 1030 of the one or more control regions for the one or more automatic gain control measurements. The remote UE 115 may identify, according to the quasi-colocation relationship, a second symbol period 1025-*b* preceding the first data region 1005 and the second data region 1010 for the one or more automatic gain control measurements. The remote UE 115 may then perform the one or more automatic gain control measurements on the first symbol period 1025-*a* and the second symbol period 1025-*b*. The UE 115 may receive, based on the one or more automatic gain control measurements, a first data message from the first relay UE in the first data region 1005 and a second data message from the second relay UE in the second data region 1010.

Figure 11:
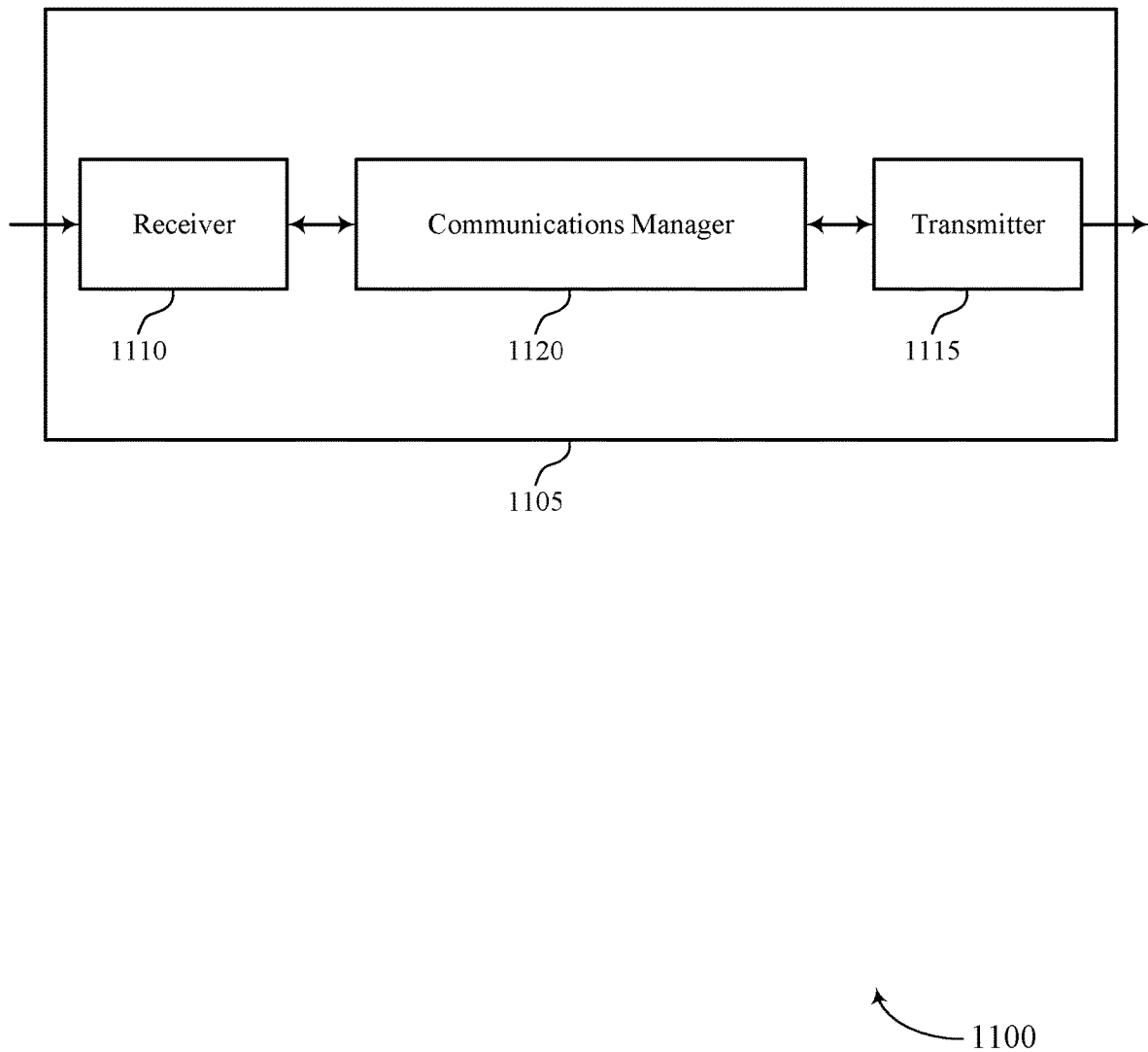
FIGS. 11 and 12 show block diagrams of devices that support quasi-colocation and automatic gain control determination for multi-relay sidelink communications in accordance with aspects of the present disclosure.

FIG. 11 shows a block diagram 1100 of a device 1105 that supports quasi-colocation and automatic gain control determination for multi-relay sidelink communications in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to quasi-colocation and automatic gain control determination for multi-relay sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to quasi-colocation and automatic gain control determination for multi-relay sidelink communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of quasi-colocation and automatic gain control determination for multi-relay sidelink communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a remote UE in accordance with examples as disclosed herein. For example, the communications manager 1120 may be configured as or otherwise support a means for identifying a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs. The communications manager 1120 may be configured as or otherwise support a means for identifying, according to the quasi-colocation relationship, one or more symbol periods of the time interval for one or more automatic gain control measurements for the one or more control regions and the set of multiple data regions. The communications manager 1120 may be configured as or otherwise support a means for performing the one or more automatic gain control measurements on signals received in the one or more symbol periods of the time interval for the one or more automatic gain control measurements. The communications manager 1120 may be configured as or otherwise support a means for receiving, based on the one or more automatic gain control measurements, a first data message from the first relay UE in the first data region and a second data message from the second relay UE in the second data region.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, more efficient utilization of communication resources.

Figure 12:
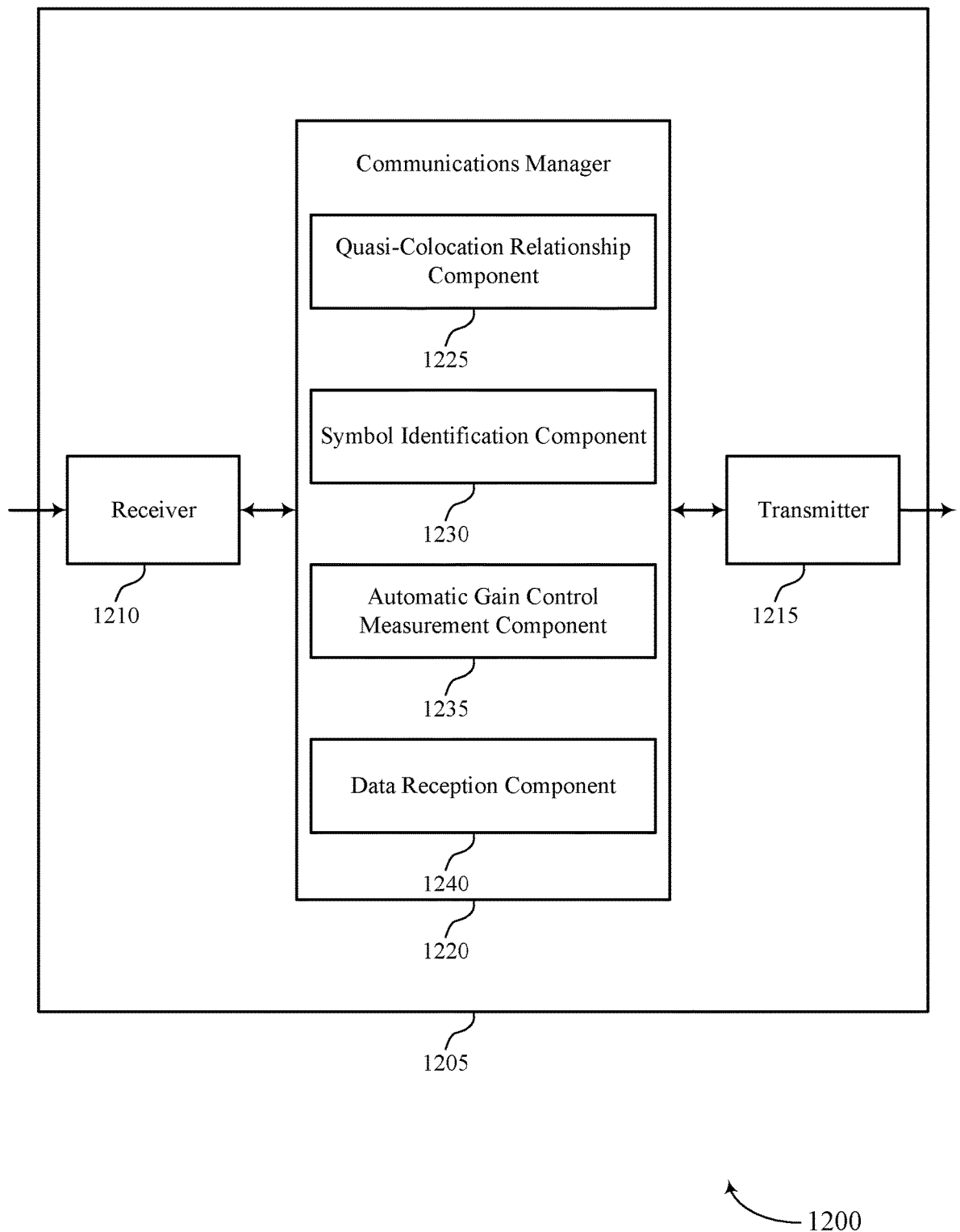

FIG. 12 shows a block diagram 1200 of a device 1205 that supports quasi-colocation and automatic gain control determination for multi-relay sidelink communications in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to quasi-colocation and automatic gain control determination for multi-relay sidelink communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to quasi-colocation and automatic gain control determination for multi-relay sidelink communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of quasi-colocation and automatic gain control determination for multi-relay sidelink communications as described herein. For example, the communications manager 1220 may include a quasi-colocation relationship component 1225, a symbol identification component 1230, an automatic gain control measurement component 1235, a data reception component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a remote UE in accordance with examples as disclosed herein. The quasi-colocation relationship component 1225 may be configured as or otherwise support a means for identifying a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs. The symbol identification component 1230 may be configured as or otherwise support a means for identifying, according to the quasi-colocation relationship, one or more symbol periods of the time interval for one or more automatic gain control measurements for the one or more control regions and the set of multiple data regions.

The automatic gain control measurement component 1235 may be configured as or otherwise support a means for performing the one or more automatic gain control measurements on signals received in the one or more symbol periods of the time interval for the one or more automatic gain control measurements. The data reception component 1240 may be configured as or otherwise support a means for receiving, based on the one or more automatic gain control measurements, a first data message from the first relay UE in the first data region and a second data message from the second relay UE in the second data region.

Figure 13:
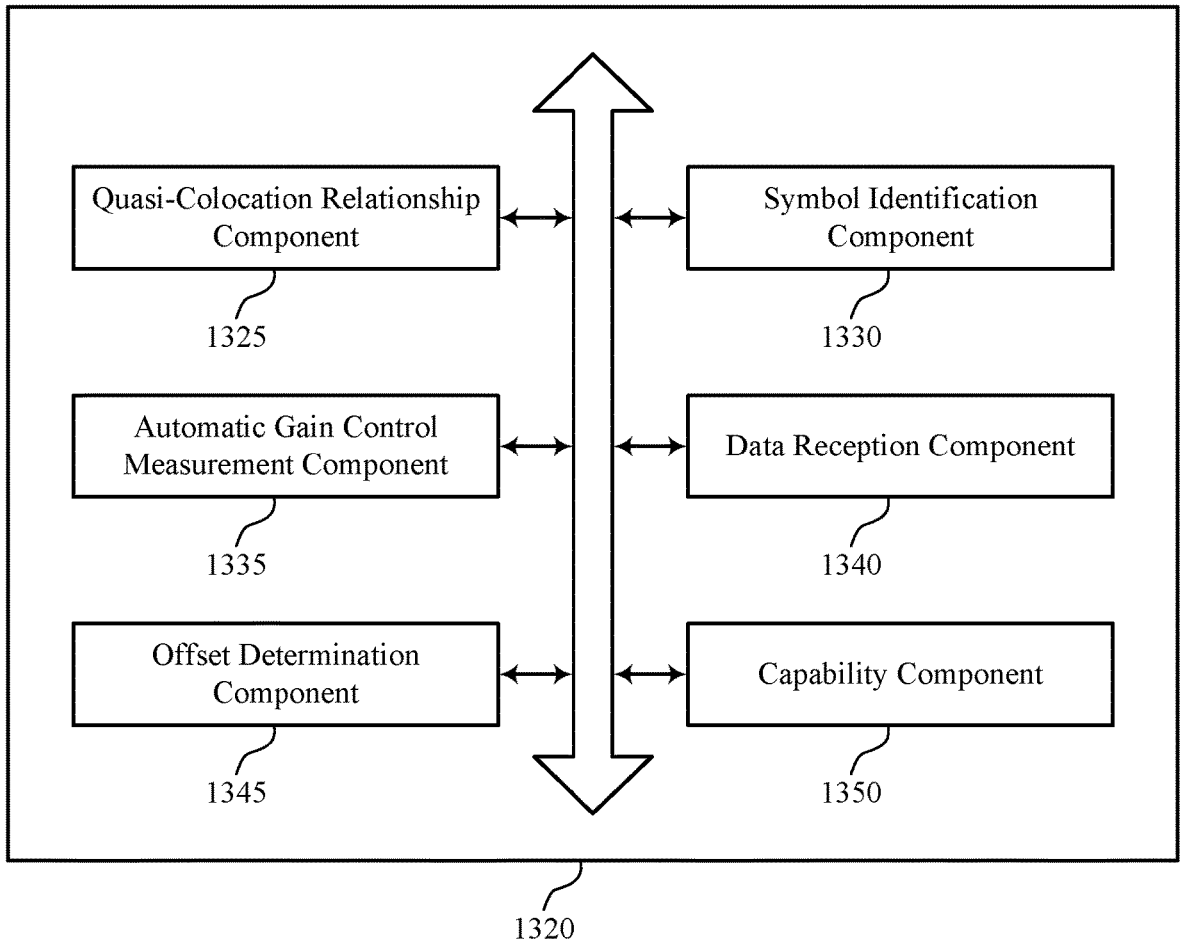
FIG. 13 shows a block diagram of a communications manager that supports quasi-colocation and automatic gain control determination for multi-relay sidelink communications in accordance with aspects of the present disclosure.

FIG. 13 shows a block diagram 1300 of a communications manager 1320 that supports quasi-colocation and automatic gain control determination for multi-relay sidelink communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of quasi-colocation and automatic gain control determination for multi-relay sidelink communications as described herein. For example, the communications manager 1320 may include a quasi-colocation relationship component 1325, a symbol identification component 1330, an automatic gain control measurement component 1335, a data reception component 1340, an offset determination component 1345, a capability component 1350, or any combination thereof. Each of these components may communicate, directly or indirectly, with one another (e.g., via one or more buses).

The communications manager 1320 may support wireless communication at a remote UE in accordance with examples as disclosed herein. The quasi-colocation relationship component 1325 may be configured as or otherwise support a means for identifying a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs. The symbol identification component 1330 may be configured as or otherwise support a means for identifying, according to the quasi-colocation relationship, one or more symbol periods of the time interval for one or more automatic gain control measurements for the one or more control regions and the set of multiple data regions.

The automatic gain control measurement component 1335 may be configured as or otherwise support a means for performing the one or more automatic gain control measurements on signals received in the one or more symbol periods of the time interval for the one or more automatic gain control measurements. The data reception component 1340 may be configured as or otherwise support a means for receiving, based on the one or more automatic gain control measurements, a first data message from the first relay UE in the first data region and a second data message from the second relay UE in the second data region.

In some examples, to support identifying the one or more symbol periods of the time interval for the one or more automatic gain control measurements, the symbol identification component 1330 may be configured as or otherwise support a means for identifying, according to the quasi-colocation relationship, a first symbol period preceding the first data region for the first relay UE and a second symbol period preceding the second data region for the second relay UE for the one or more automatic gain control measurements, where performing the one or more automatic gain control measurements includes performing the one or more automatic gain control measurements on the signals received in the first symbol period and the second symbol period.

In some examples, to support identifying the one or more symbol periods of the time interval for the one or more automatic gain control measurements, the symbol identification component 1330 may be configured as or otherwise support a means for identifying, according to the quasi-colocation relationship, a symbol period preceding a control region of the one or more control regions and the second data region for the second relay UE for the one or more automatic gain control measurements, where the control region and the second data region are frequency division multiplexed, and where performing the one or more automatic gain control measurements includes performing the one or more automatic gain control measurements on the signals received in the identified symbol period.

In some examples, to support identifying the one or more symbol periods of the time interval for the one or more automatic gain control measurements, the symbol identification component 1330 may be configured as or otherwise support a means for identifying, according to the quasi-colocation relationship, a first symbol period preceding a control region of the one or more control regions and the first data region for the first relay UE for the one or more automatic gain control measurements, where the control region and the first data region are frequency division multiplexed. In some examples, to support identifying the one or more symbol periods of the time interval for the one or more automatic gain control measurements, the symbol identification component 1330 may be configured as or otherwise support a means for identifying, according to the quasi-colocation relationship, a second symbol period preceding the second data region for the second relay UE for the one or more automatic gain control measurements, where performing the one or more automatic gain control measurements includes performing the one or more automatic gain control measurements on the signals received in the first symbol period and the second symbol period.

In some examples, to support identifying the one or more symbol periods of the time interval for the one or more automatic gain control measurements, the symbol identification component 1330 may be configured as or otherwise support a means for identifying, according to the quasi-colocation relationship, a first symbol period preceding a control region of the one or more control regions and the first data region for the first relay UE for the one or more automatic gain control measurements, where the control region and the first data region are included in a first slot of the time interval.

In some examples, to support identifying the one or more symbol periods of the time interval for the one or more automatic gain control measurements, the symbol identification component 1330 may be configured as or otherwise support a means for identifying, according to the quasi-colocation relationship, a second symbol period preceding the second data region for the second relay UE for the one or more automatic gain control measurements, where the second data region is included in a second slot of the time interval, and where performing the one or more automatic gain control measurements includes performing the one or more automatic gain control measurements on the signals received in the first symbol period and the second symbol period. In some examples, the capability component 1350 may be configured as or otherwise support a means for transmitting an indication of a capability of the remote UE to track simultaneously at least two sidelink quasi-colocation parameters.

In some examples, to support identifying the quasi-colocation relationship between the one or more control regions and the set of multiple data regions, the quasi-colocation relationship component 1325 may be configured as or otherwise support a means for identifying the quasi-colocation relationship between a first control region of the one or more control regions and the first data region, and between one or more reference signals in the first control region and the second data region.

In some examples, to support identifying the one or more symbol periods of the time interval for the one or more automatic gain control measurements, the symbol identification component 1330 may be configured as or otherwise support a means for identifying, according to the quasi-colocation relationship, a symbol period preceding the first control region including the one or more reference signals for the one or more automatic gain control measurements, where performing the one or more automatic gain control measurements includes performing the one or more automatic gain control measurements on the signals received in the identified symbol period.

In some examples, the offset determination component 1345 may be configured as or otherwise support a means for performing a channel state information measurement to calculate a relative power offset between the first data region for the first relay UE and the second data region for the second relay UE.

In some examples, to support identifying the one or more symbol periods of the time interval for the one or more automatic gain control measurements, the quasi-colocation relationship component 1325 may be configured as or otherwise support a means for identifying, according to the quasi-colocation relationship, a symbol period preceding a first control region of the one or more control regions for the one or more automatic gain control measurements, where performing the one or more automatic gain control measurements includes performing the one or more automatic gain control measurements on the signals received in the identified symbol period. In some examples, a second control region of the one or more control regions succeeds the first control region, the first control region being associated with the first relay UE and the second control region being associated with the second relay UE.

In some examples, to support identifying the one or more symbol periods of the time interval for the one or more automatic gain control measurements, the symbol identification component 1330 may be configured as or otherwise support a means for identifying, according to the quasi-colocation relationship, a first symbol period preceding a first control region of the one or more control regions and a second control region of the one or more control regions for the one or more automatic gain control measurements, where the first control region and the second control region are frequency division multiplexed, the first control region being associated with the first relay UE and the second control region being associated with the second relay UE.

In some examples, the symbol identification component 1330 may be configured as or otherwise support a means for identifying, according to the quasi-colocation relationship, a second symbol period preceding the first data region and the second data region for the one or more automatic gain control measurements, where the first data region and the second data region are frequency division multiplexed, and where performing the one or more automatic gain control measurements includes performing the one or more automatic gain control measurements on the signals received in the first symbol period and the second symbol period.

In some examples, the quasi-colocation relationship component 1325 may be configured as or otherwise support a means for receiving an indication of the quasi-colocation relationship between the one or more control regions of the time interval and the set of multiple data regions of the time interval for the communications via the set of multiple relay UEs, where the indication includes at least one of a radio resource control signal or a sidelink control information.

Figure 14:
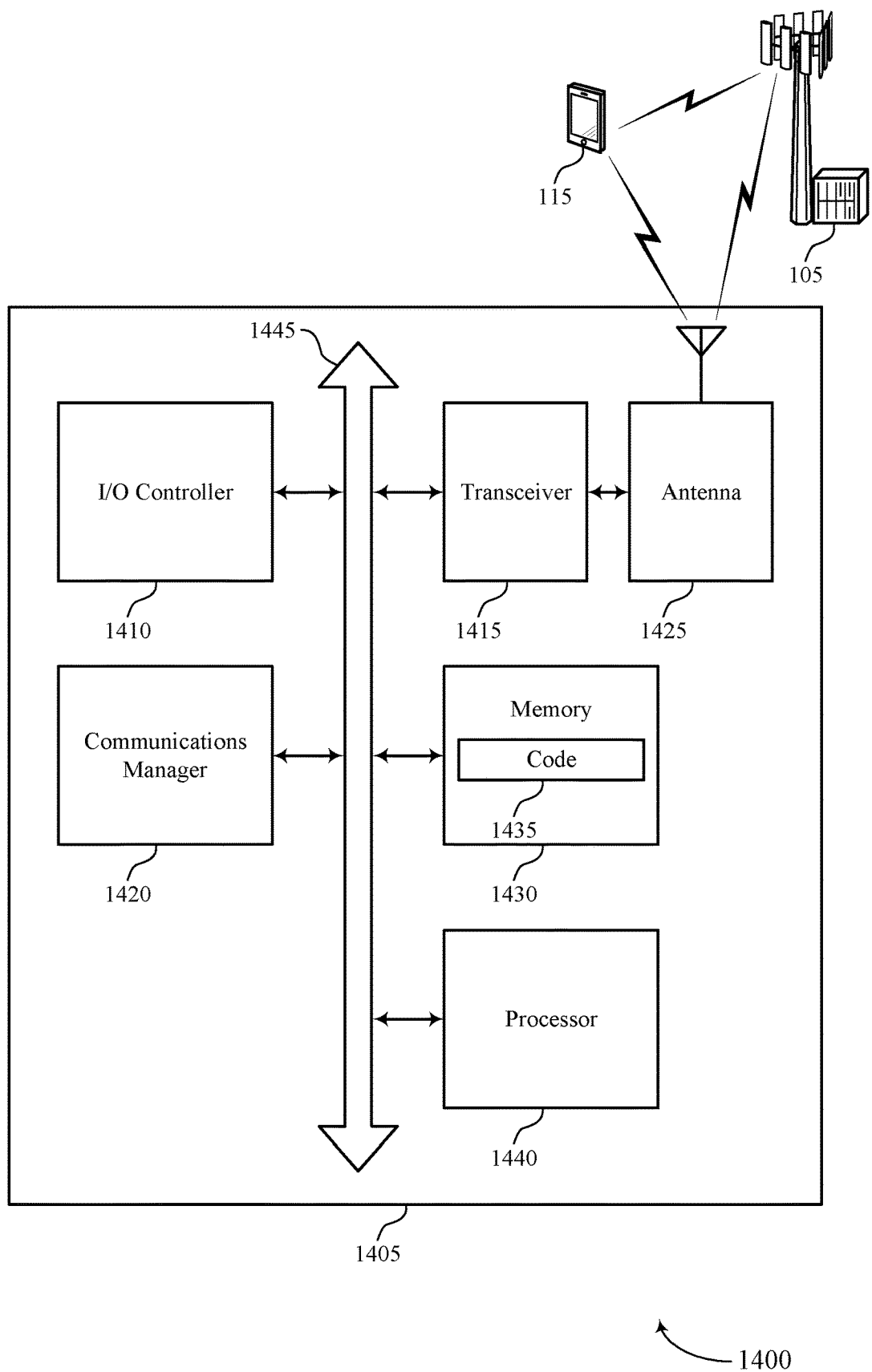
FIG. 14 shows a diagram of a system including a device that supports quasi-colocation and automatic gain control determination for multi-relay sidelink communications in accordance with aspects of the present disclosure.

FIG. 14 shows a diagram of a system 1400 including a device 1405 that supports quasi-colocation and automatic gain control determination for multi-relay sidelink communications in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting quasi-colocation and automatic gain control determination for multi-relay sidelink communications). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a remote UE in accordance with examples as disclosed herein. For example, the communications manager 1420 may be configured as or otherwise support a means for identifying a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs. The communications manager 1420 may be configured as or otherwise support a means for identifying, according to the quasi-colocation relationship, one or more symbol periods of the time interval for one or more automatic gain control measurements for the one or more control regions and the set of multiple data regions. The communications manager 1420 may be configured as or otherwise support a means for performing the one or more automatic gain control measurements on signals received in the one or more symbol periods of the time interval for the one or more automatic gain control measurements. The communications manager 1420 may be configured as or otherwise support a means for receiving, based on the one or more automatic gain control measurements, a first data message from the first relay UE in the first data region and a second data message from the second relay UE in the second data region.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of quasi-colocation and automatic gain control determination for multi-relay sidelink communications as described herein, or the processor 1440 and the memory 1430 may be otherwise configured to perform or support such operations.

Figure 15:
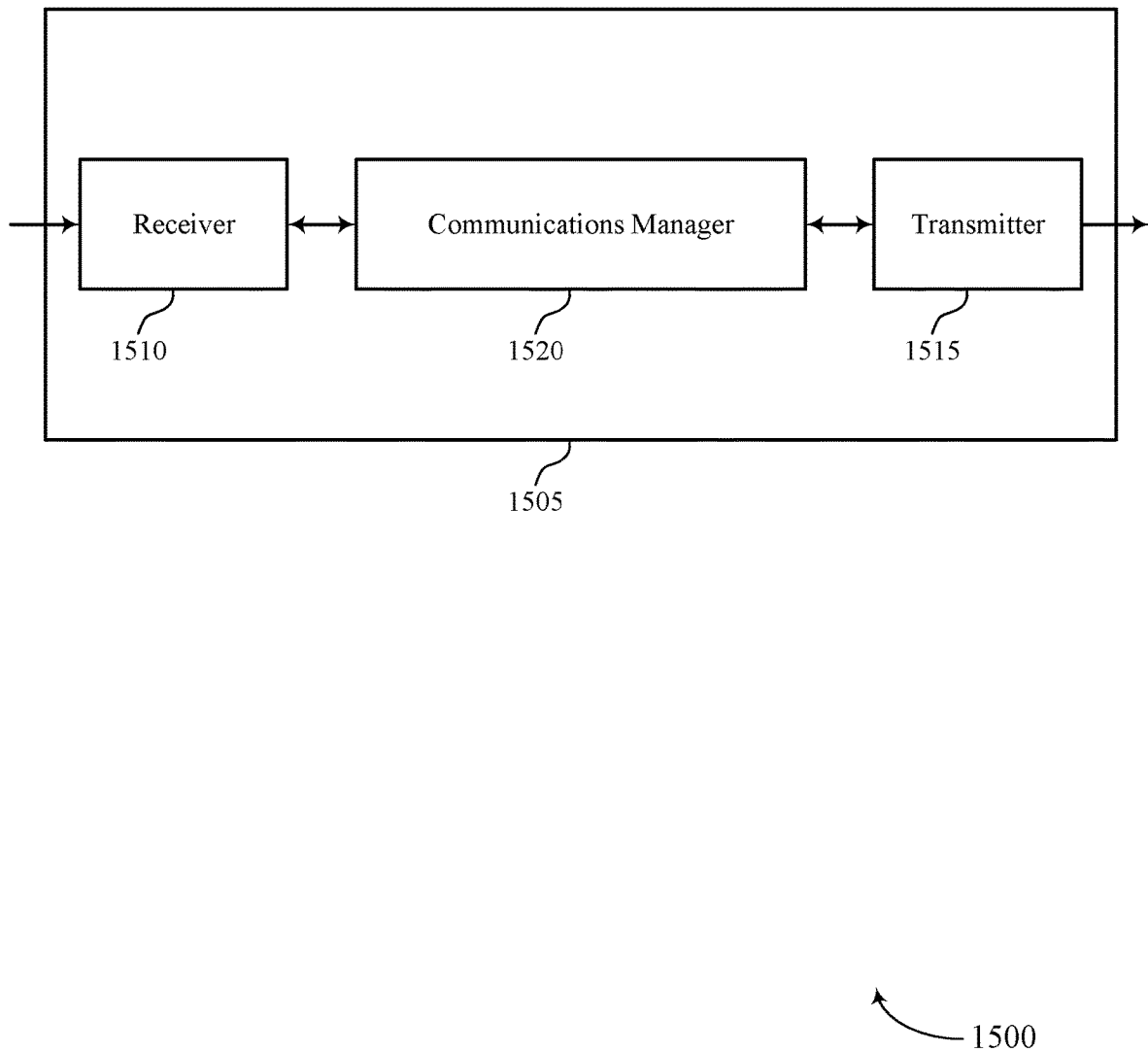
FIGS. 15 and 16 show block diagrams of devices that support quasi-colocation and automatic gain control determination for multi-relay sidelink communications in accordance with aspects of the present disclosure.

FIG. 15 shows a block diagram 1500 of a device 1505 that supports quasi-colocation and automatic gain control determination for multi-relay sidelink communications in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to quasi-colocation and automatic gain control determination for multi-relay sidelink communications). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to quasi-colocation and automatic gain control determination for multi-relay sidelink communications). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of quasi-colocation and automatic gain control determination for multi-relay sidelink communications as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a wireless node in accordance with examples as disclosed herein. For example, the communications manager 1520 may be configured as or otherwise support a means for identifying a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs. The communications manager 1520 may be configured as or otherwise support a means for identifying, according to the quasi-colocation relationship, one or more symbol periods of the time interval for one or more automatic gain control measurements by the remote UE for the one or more control regions and the set of multiple data regions. The communications manager 1520 may be configured as or otherwise support a means for transmitting, based on identifying the one or more symbol periods of the time interval for the one or more automatic gain control measurements, a first data message to the remote UE via the first relay UE in the first data region and a second data message to the remote UE via the second relay UE in the second data region.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for more efficient utilization of communication resources.

Figure 16:
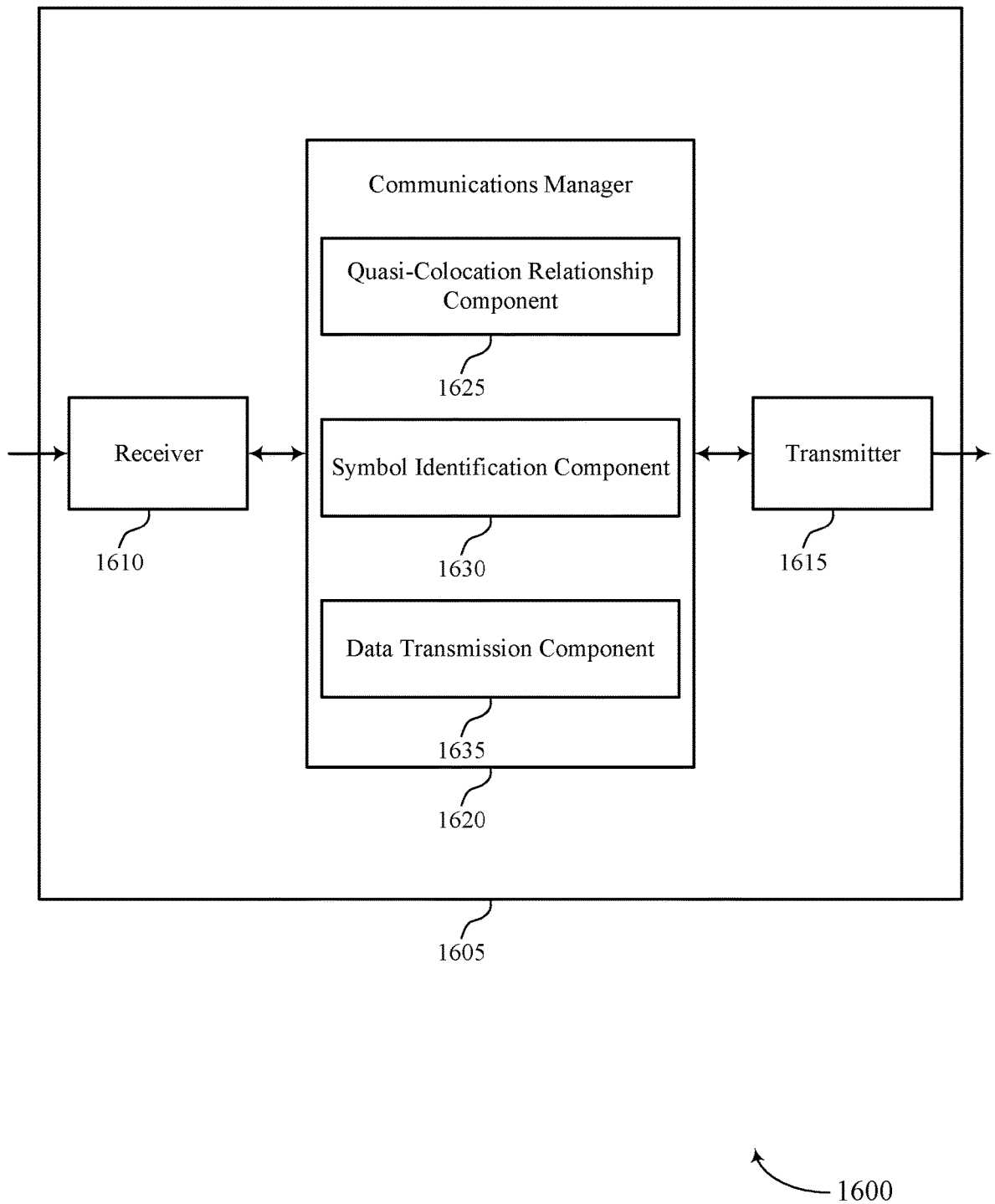

FIG. 16 shows a block diagram 1600 of a device 1605 that supports quasi-colocation and automatic gain control determination for multi-relay sidelink communications in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to quasi-colocation and automatic gain control determination for multi-relay sidelink communications). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to quasi-colocation and automatic gain control determination for multi-relay sidelink communications). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of quasi-colocation and automatic gain control determination for multi-relay sidelink communications as described herein. For example, the communications manager 1620 may include a quasi-colocation relationship component 1625, a symbol identification component 1630, a data transmission component 1635, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a wireless node in accordance with examples as disclosed herein. The quasi-colocation relationship component 1625 may be configured as or otherwise support a means for identifying a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs.

The symbol identification component 1630 may be configured as or otherwise support a means for identifying, according to the quasi-colocation relationship, one or more symbol periods of the time interval for one or more automatic gain control measurements by the remote UE for the one or more control regions and the set of multiple data regions. The data transmission component 1635 may be configured as or otherwise support a means for transmitting, based on identifying the one or more symbol periods of the time interval for the one or more automatic gain control measurements, a first data message to the remote UE via the first relay UE in the first data region and a second data message to the remote UE via the second relay UE in the second data region.

Figure 17:
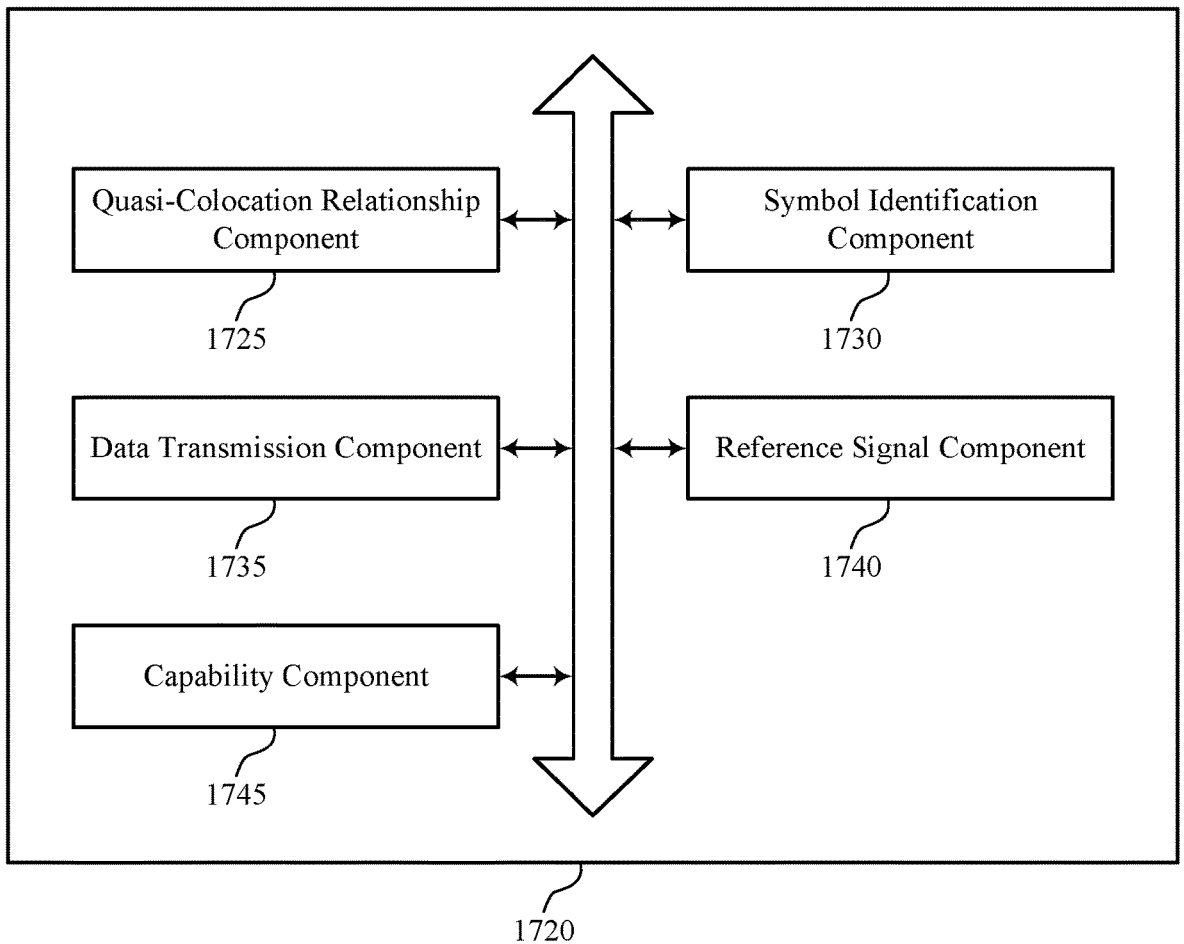
FIG. 17 shows a block diagram of a communications manager that supports quasi-colocation and automatic gain control determination for multi-relay sidelink communications in accordance with aspects of the present disclosure.

FIG. 17 shows a block diagram 1700 of a communications manager 1720 that supports quasi-colocation and automatic gain control determination for multi-relay sidelink communications in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of quasi-colocation and automatic gain control determination for multi-relay sidelink communications as described herein. For example, the communications manager 1720 may include a quasi-colocation relationship component 1725, a symbol identification component 1730, a data transmission component 1735, a reference signal component 1740, a capability component 1745, or any combination thereof. Each of these components may communicate, directly or indirectly, with one another (e.g., via one or more buses).

The communications manager 1720 may support wireless communication at a wireless node in accordance with examples as disclosed herein. The quasi-colocation relationship component 1725 may be configured as or otherwise support a means for identifying a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs. The symbol identification component 1730 may be configured as or otherwise support a means for identifying, according to the quasi-colocation relationship, one or more symbol periods of the time interval for one or more automatic gain control measurements by the remote UE for the one or more control regions and the set of multiple data regions. The data transmission component 1735 may be configured as or otherwise support a means for transmitting, based on identifying the one or more symbol periods of the time interval for the one or more automatic gain control measurements, a first data message to the remote UE via the first relay UE in the first data region and a second data message to the remote UE via the second relay UE in the second data region.

In some examples, to support identifying the one or more symbol periods of the time interval for the one or more automatic gain control measurements, the symbol identification component 1730 may be configured as or otherwise support a means for identifying, according to the quasi-colocation relationship, a first symbol period preceding the first data region for the first relay UE and a second symbol period preceding the second data region for the second relay UE for the one or more automatic gain control measurements.

In some examples, to support identifying the one or more symbol periods of the time interval for the one or more automatic gain control measurements, the symbol identification component 1730 may be configured as or otherwise support a means for identifying, according to the quasi-colocation relationship, a symbol period preceding a control region of the one or more control regions and the second data region for the second relay UE for the one or more automatic gain control measurements, where the control region and the second data region are frequency division multiplexed.

In some examples, to support identifying the one or more symbol periods of the time interval for the one or more automatic gain control measurements, the symbol identification component 1730 may be configured as or otherwise support a means for identifying, according to the quasi-colocation relationship, a first symbol period preceding a control region of the one or more control regions and the first data region for the first relay UE for the one or more automatic gain control measurements, where the control region and the first data region are frequency division multiplexed. In some examples, to support identifying the one or more symbol periods of the time interval for the one or more automatic gain control measurements, the symbol identification component 1730 may be configured as or otherwise support a means for identifying, according to the quasi-colocation relationship, a second symbol period preceding the second data region for the second relay UE for the one or more automatic gain control measurements.

In some examples, to support identifying the one or more symbol periods of the time interval for the one or more automatic gain control measurements, the symbol identification component 1730 may be configured as or otherwise support a means for identifying, according to the quasi-colocation relationship, a first symbol period preceding a control region of the one or more control regions and the first data region for the first relay UE for the one or more automatic gain control measurements, where the control region and the first data region are included in a first slot of the time interval.

In some examples, to support identifying the one or more symbol periods of the time interval for the one or more automatic gain control measurements, the symbol identification component 1730 may be configured as or otherwise support a means for identifying, according to the quasi-colocation relationship, a second symbol period preceding the second data region for the second relay UE for the one or more automatic gain control measurements, where the second data region is included in a second slot of the time interval. In some examples, the capability component 1745 may be configured as or otherwise support a means for receiving, from the remote UE, an indication of a capability of the remote UE to simultaneously track at least two sidelink quasi-colocation parameters.

In some examples, to support identifying the quasi-colocation relationship between the one or more control regions and the set of multiple data regions, the quasi-colocation relationship component 1725 may be configured as or otherwise support a means for identifying the quasi-colocation relationship between a first control region of the one or more control regions and the first data region, and between one or more reference signals in the first control region and the second data region. In some examples, to support identifying the quasi-colocation relationship between the one or more control regions and the set of multiple data regions, the reference signal component 1740 may be configured as or otherwise support a means for transmitting the one or more reference signals in the first control region.

In some examples, to support identifying the one or more symbol periods of the time interval for the one or more automatic gain control measurements, the symbol identification component 1730 may be configured as or otherwise support a means for identifying, according to the quasi-colocation relationship, a first symbol period preceding a first control region of the one or more control regions and a second control region of the one or more control regions for the one or more automatic gain control measurements, where the first control region and the second control region are frequency division multiplexed, the first control region being associated with the first relay UE and the second control region being associated with the second relay UE.

In some examples, the symbol identification component 1730 may be configured as or otherwise support a means for identifying, according to the quasi-colocation relationship, a second symbol period preceding the first data region and the second data region for the one or more automatic gain control measurements, where the first data region and the second data region are frequency division multiplexed.

In some examples, the quasi-colocation relationship component 1725 may be configured as or otherwise support a means for transmitting an indication of the quasi-colocation relationship between the one or more control regions of the time interval and the set of multiple data regions of the time interval for the communications of the wireless node with the remote UE via the set of multiple relay UEs, where the indication includes at least one of a radio resource control signal or a sidelink control information.

In some examples, the wireless node includes a UE or a base station.

Figure 18:
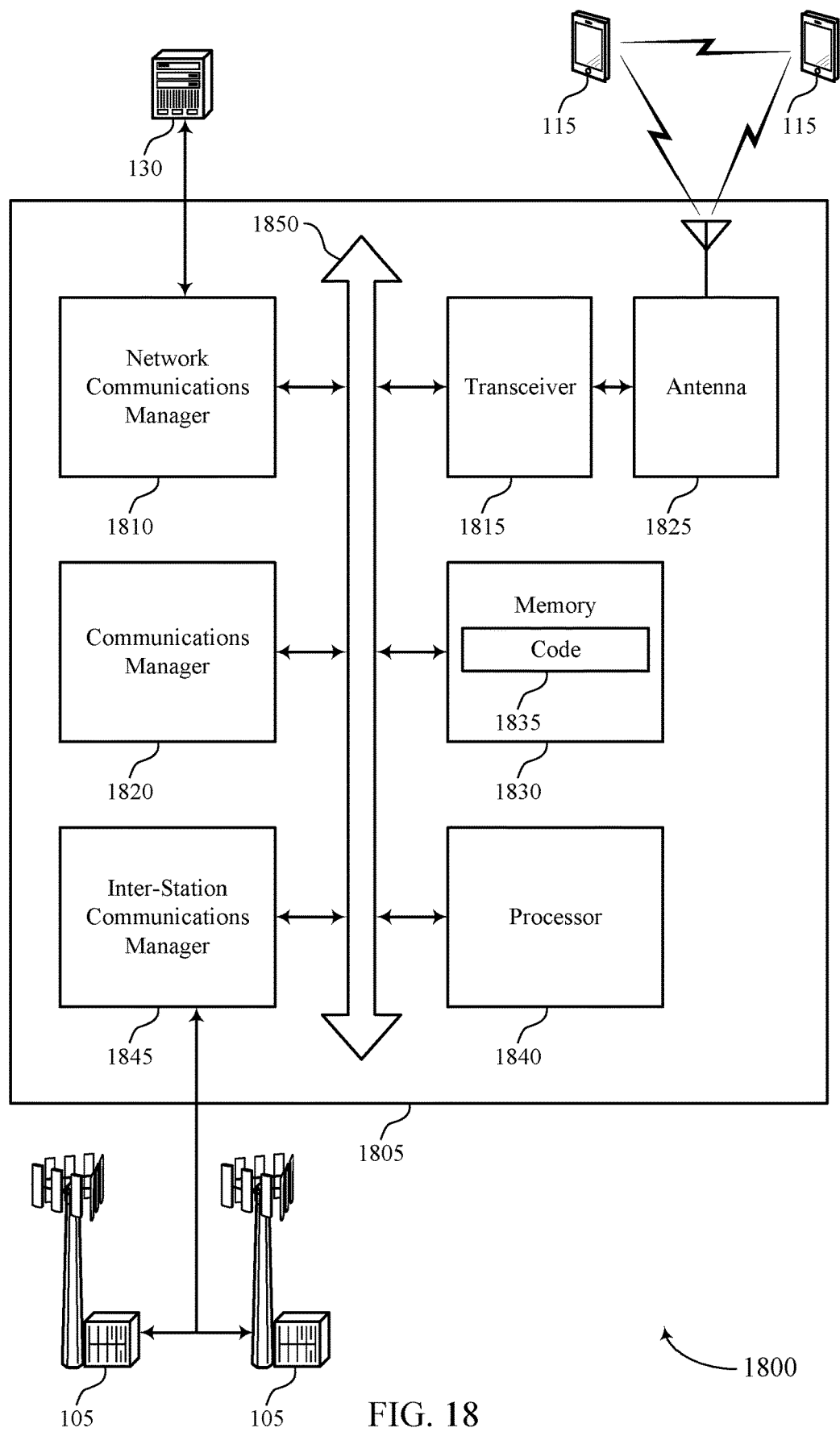
FIG. 18 shows a diagram of a system including a device that supports quasi-colocation and automatic gain control determination for multi-relay sidelink communications in accordance with aspects of the present disclosure.

FIG. 18 shows a diagram of a system 1800 including a device 1805 that supports quasi-colocation and automatic gain control determination for multi-relay sidelink communications in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting quasi-colocation and automatic gain control determination for multi-relay sidelink communications). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a wireless node in accordance with examples as disclosed herein. For example, the communications manager 1820 may be configured as or otherwise support a means for identifying a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs. The communications manager 1820 may be configured as or otherwise support a means for identifying, according to the quasi-colocation relationship, one or more symbol periods of the time interval for one or more automatic gain control measurements by the remote UE for the one or more control regions and the set of multiple data regions. The communications manager 1820 may be configured as or otherwise support a means for transmitting, based on identifying the one or more symbol periods of the time interval for the one or more automatic gain control measurements, a first data message to the remote UE via the first relay UE in the first data region and a second data message to the remote UE via the second relay UE in the second data region.

By including or configuring the communications manager 1820 in accordance with examples as described herein, the device 1805 may support techniques for improved communication reliability, reduced latency, improved user experience related to reduced processing, more efficient utilization of communication resources, improved coordination between devices, and improved utilization of processing capability.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of quasi-colocation and automatic gain control determination for multi-relay sidelink communications as described herein, or the processor 1840 and the memory 1830 may be otherwise configured to perform or support such operations.

Figure 19:
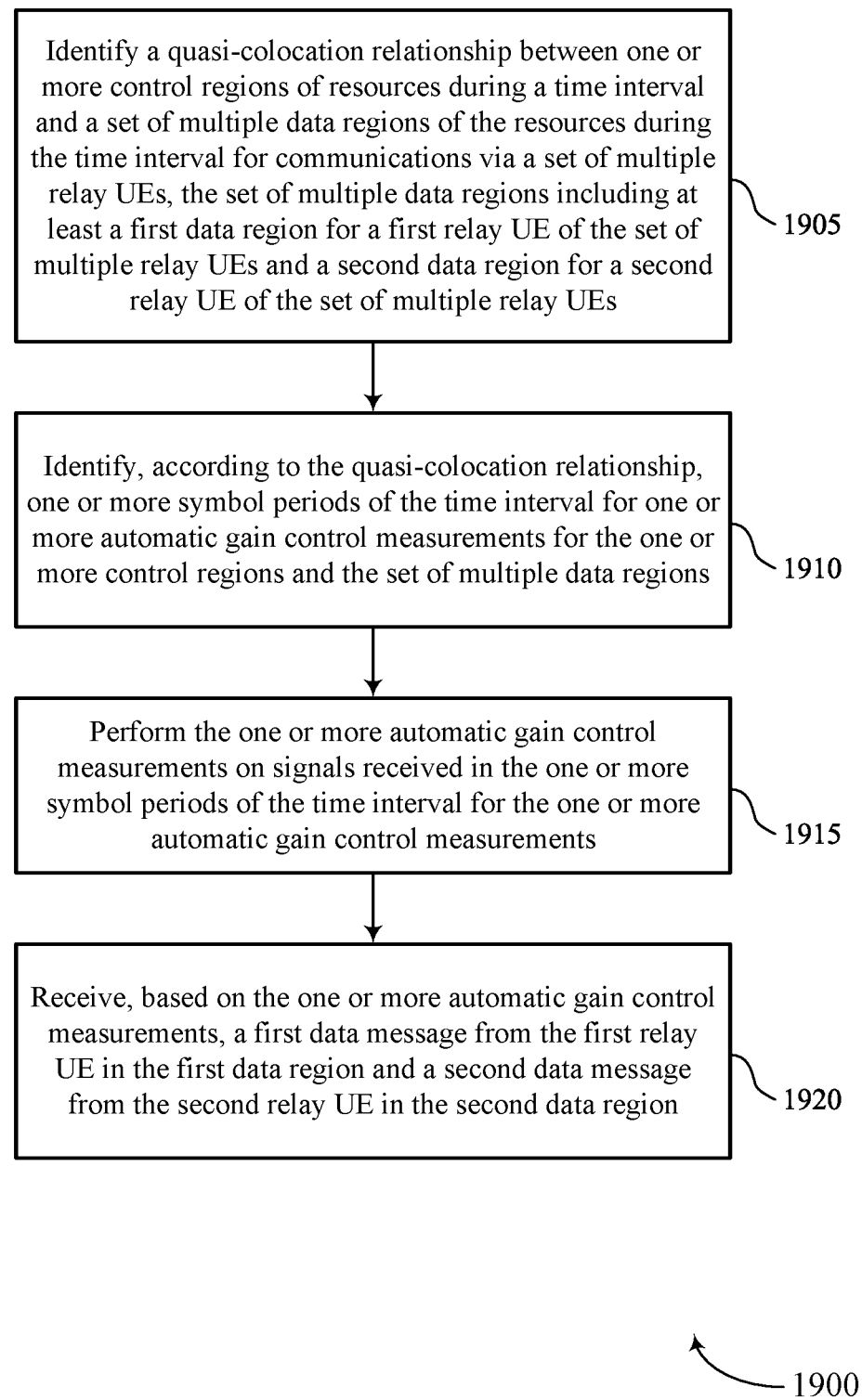
FIGS. 19 through 22 show flowcharts illustrating methods that support quasi-colocation and automatic gain control determination for multi-relay sidelink communications in accordance with aspects of the present disclosure.

FIG. 19 shows a flowchart illustrating a method 1900 that supports quasi-colocation and automatic gain control determination for multi-relay sidelink communications in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include identifying a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs. The operations of 1905 may be performed in accordance with examples as disclosed herein. In some examples, aspects of the operations of 1905 may be performed by a quasi-colocation relationship component 1325 as described with reference to FIG. 13.

At 1910, the method may include identifying, according to the quasi-colocation relationship, one or more symbol periods of the time interval for one or more automatic gain control measurements for the one or more control regions and the set of multiple data regions. The operations of 1910 may be performed in accordance with examples as disclosed herein. In some examples, aspects of the operations of 1910 may be performed by a symbol identification component 1330 as described with reference to FIG. 13.

At 1915, the method may include performing the one or more automatic gain control measurements on signals received in the one or more symbol periods of the time interval for the one or more automatic gain control measurements. The operations of 1915 may be performed in accordance with examples as disclosed herein. In some examples, aspects of the operations of 1915 may be performed by an automatic gain control measurement component 1335 as described with reference to FIG. 13.

At 1920, the method may include receiving, based on the one or more automatic gain control measurements, a first data message from the first relay UE in the first data region and a second data message from the second relay UE in the second data region. The operations of 1920 may be performed in accordance with examples as disclosed herein. In some examples, aspects of the operations of 1920 may be performed by a data reception component 1340 as described with reference to FIG. 13.

Figure 20:
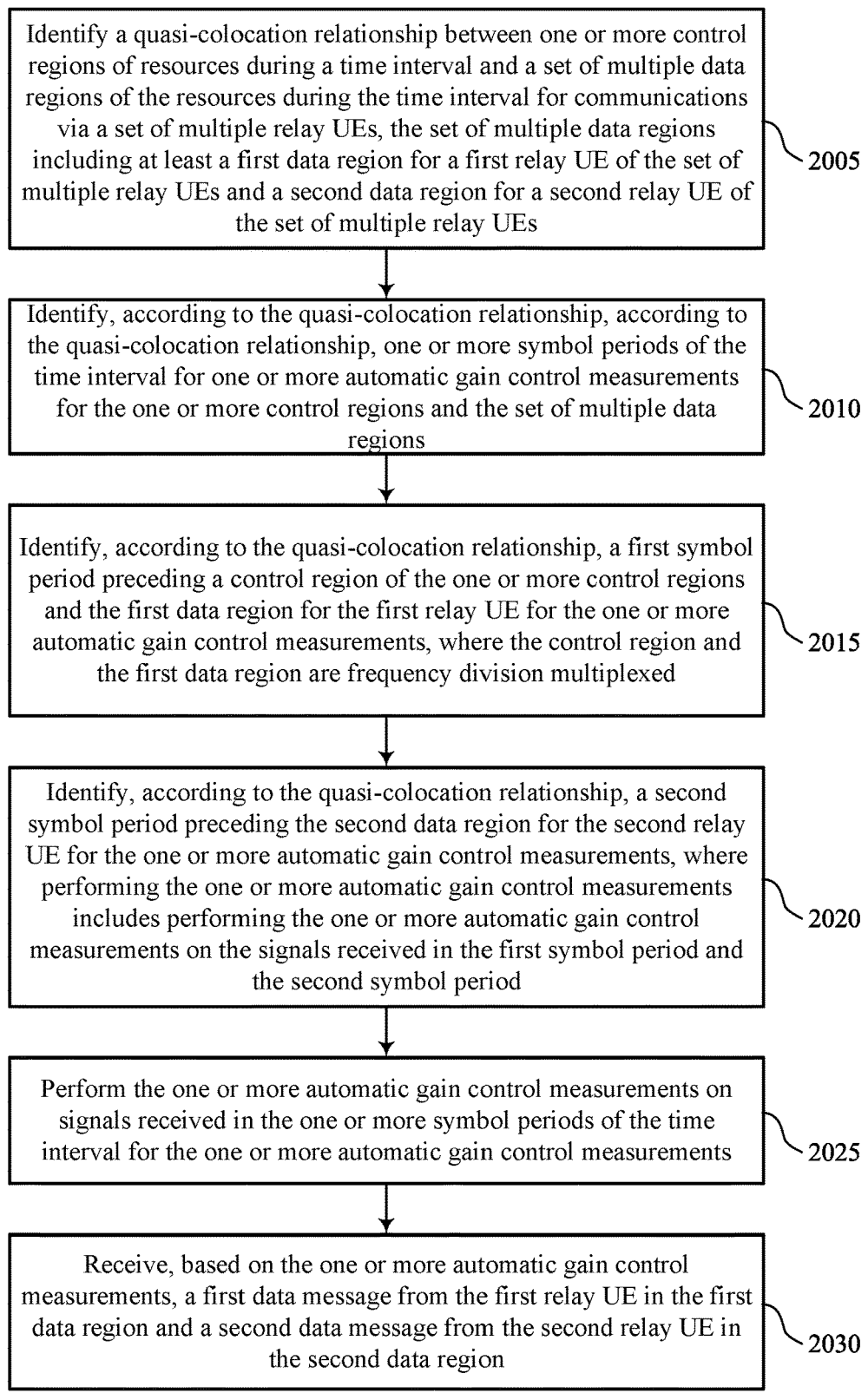

FIG. 20 shows a flowchart illustrating a method 2000 that supports quasi-colocation and automatic gain control determination for multi-relay sidelink communications in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include identifying a quasi-colocation relationship between one or more control regions of resources during a time interval and a set of multiple data regions of the resources during the time interval for communications via a set of multiple relay UEs, the set of multiple data regions including at least a first data region for a first relay UE of the set of multiple relay UEs and a second data region for a second relay UE of the set of multiple relay UEs. The operations of 2005 may be performed in accordance with examples as disclosed herein. In some examples, aspects of the operations of 2005 may be performed by a quasi-colocation relationship component 1325 as described with reference to FIG. 13.

At 2010, the method may include identifying, according to the quasi-colocation relationship, one or more symbol periods of the time interval for one or more automatic gain control measurements for the one or more control regions and the set of multiple data regions. The operations of 2010 may be performed in accordance with examples as disclosed herein. In some examples, aspects of the operations of 2010 may be performed by a symbol identification component 1330 as described with reference to FIG. 13.

At 2015, the method may include identifying, according to the quasi-colocation relationship, a first symbol period preceding a control region of the one or more control regions and the first data region for the first relay UE for the one or more automatic gain control measurements, where the control region and the first data region are frequency division multiplexed. The operations of 2015 may be performed in accordance with examples as disclosed herein. In some examples, aspects of the operations of 2015 may be performed by a symbol identification component 1330 as described with reference to FIG. 13.

At 2020, the method may include identifying, according to the quasi-colocation relationship, a second symbol period preceding the second data region for the second relay UE for the one or more automatic gain control measurements, where performing the one or more automatic gain control measurements includes performing the one or more automatic gain control measurements on the signals received in the first symbol period and the second symbol period. The operations of 2020 may be performed in accordance with examples as disclosed herein. In some examples, aspects of the operations of 2020 may be performed by a symbol identification component 1330 as described with reference to FIG. 13.

At 2025, the method may include performing the one or more automatic gain control measurements on signals received in the one or more symbol periods of the time interval for the one or more automatic gain control measurements. The operations of 2025 may be performed in accordance with examples as disclosed herein. In some examples, aspects of the operations of 2025 may be performed by an automatic gain control measurement component 1335 as described with reference to FIG. 13.

At 2030, the method may include receiving, based on the one or more automatic gain control measurements, a first data message from the first relay UE in the first data region and a second data message from the second relay UE in the second data region. The operations of 2030 may be performed in accordance with examples as disclosed herein. In some examples, aspects of the operations of 2030 may be performed by a data reception component 1340 as described with reference to FIG. 13.

Figure 21:
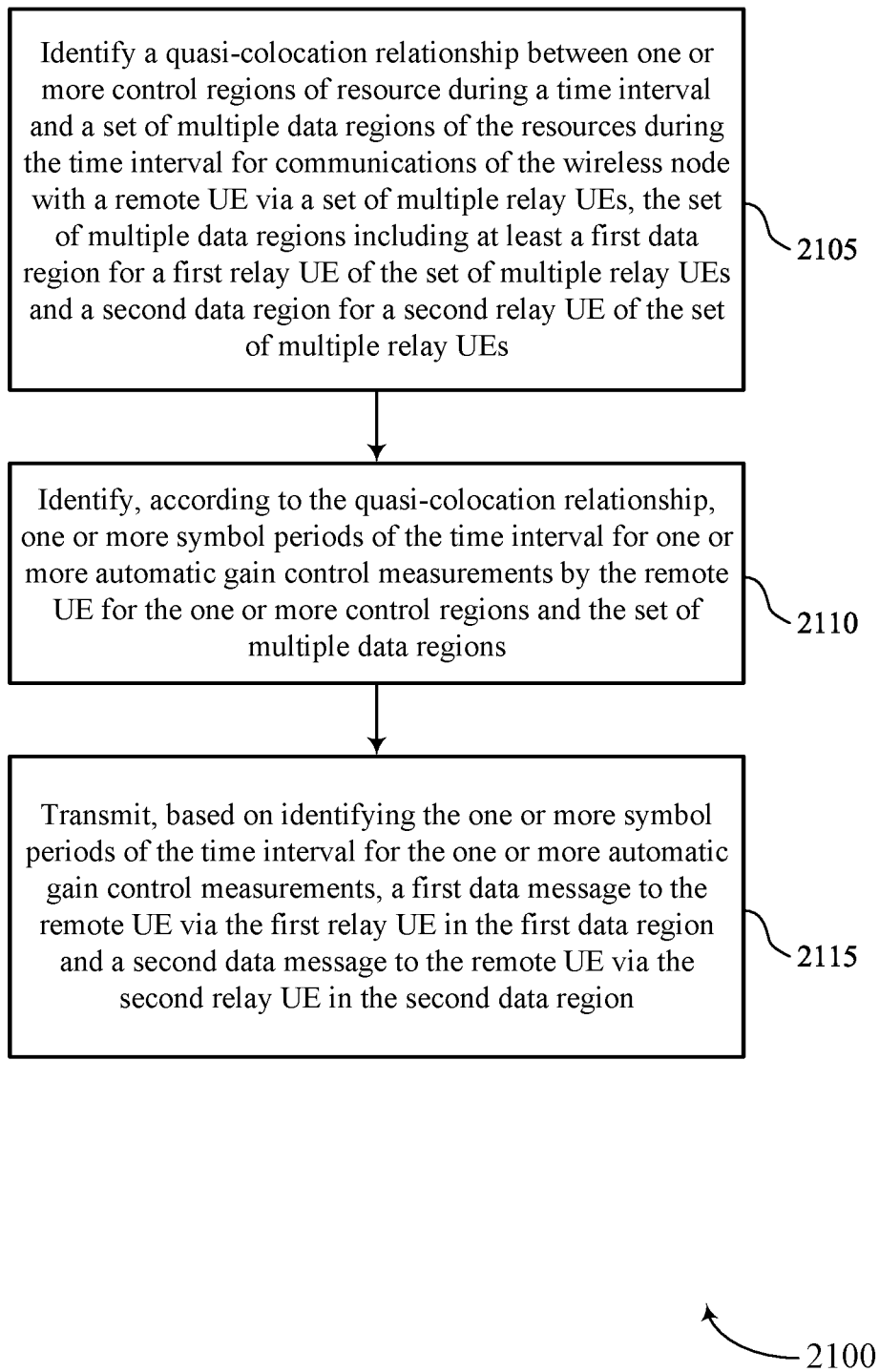

FIG. 21 shows a flowchart illustrating a method 2100 that supports quasi-colocation and automatic gain control determination for multi-relay sidelink communications in accordance with aspects of the present disclosure. The operations of the method 2100 may be implemented by a base station or its components as described herein. For example, the operations of the method 2100 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2105, the method may include identifying a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs. The operations of 2105 may be performed in accordance with examples as disclosed herein. In some examples, aspects of the operations of 2105 may be performed by a quasi-colocation relationship component 1725 as described with reference to FIG. 17.

At 2110, the method may include identifying, according to the quasi-colocation relationship, one or more symbol periods of the time interval for one or more automatic gain control measurements by the remote UE for the one or more control regions and the set of multiple data regions. The operations of 2110 may be performed in accordance with examples as disclosed herein. In some examples, aspects of the operations of 2110 may be performed by a symbol identification component 1730 as described with reference to FIG. 17.

At 2115, the method may include transmitting, based on identifying the one or more symbol periods of the time interval for the one or more automatic gain control measurements, a first data message to the remote UE via the first relay UE in the first data region and a second data message to the remote UE via the second relay UE in the second data region. The operations of 2115 may be performed in accordance with examples as disclosed herein. In some examples, aspects of the operations of 2115 may be performed by a data transmission component 1735 as described with reference to FIG. 17.

Figure 22:
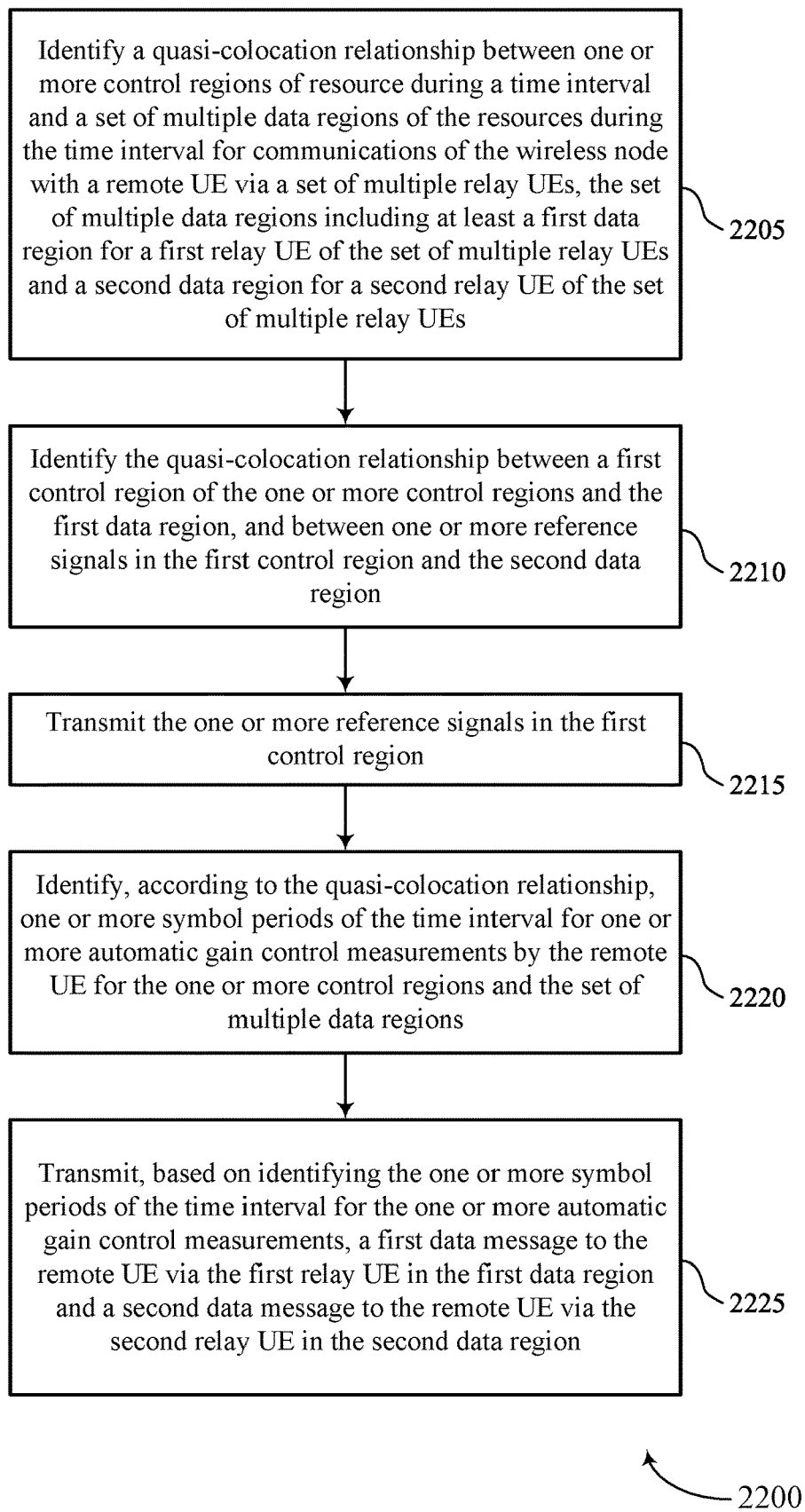

FIG. 22 shows a flowchart illustrating a method 2200 that supports quasi-colocation and automatic gain control determination for multi-relay sidelink communications in accordance with aspects of the present disclosure. The operations of the method 2200 may be implemented by a base station or its components as described herein. For example, the operations of the method 2200 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2205, the method may include identifying a quasi-colocation relationship between one or more control regions of resource during a time interval and a set of multiple data regions of the resources during the time interval for communications of the wireless node with a remote UE via a set of multiple relay UEs, the set of multiple data regions including at least a first data region for a first relay UE of the set of multiple relay UEs and a second data region for a second relay UE of the set of multiple relay UEs. The operations of 2205 may be performed in accordance with examples as disclosed herein. In some examples, aspects of the operations of 2205 may be performed by a quasi-colocation relationship component 1725 as described with reference to FIG. 17.

At 2210, the method may include identifying the quasi-colocation relationship between a first control region of the one or more control regions and the first data region, and between one or more reference signals in the first control region and the second data region. The operations of 2210 may be performed in accordance with examples as disclosed herein. In some examples, aspects of the operations of 2210 may be performed by a quasi-colocation relationship component 1725 as described with reference to FIG. 17.

At 2215, the method may include transmitting the one or more reference signals in the first control region. The operations of 2215 may be performed in accordance with examples as disclosed herein. In some examples, aspects of the operations of 2215 may be performed by a reference signal component 1740 as described with reference to FIG. 17.

At 2220, the method may include identifying, according to the quasi-colocation relationship, one or more symbol periods of the time interval for one or more automatic gain control measurements by the remote UE for the one or more control regions and the set of multiple data regions. The operations of 2220 may be performed in accordance with examples as disclosed herein. In some examples, aspects of the operations of 2220 may be performed by a symbol identification component 1730 as described with reference to FIG. 17.

At 2225, the method may include transmitting, based on identifying the one or more symbol periods of the time interval for the one or more automatic gain control measurements, a first data message to the remote UE via the first relay UE in the first data region and a second data message to the remote UE via the second relay UE in the second data region. The operations of 2225 may be performed in accordance with examples as disclosed herein. In some examples, aspects of the operations of 2225 may be performed by a data transmission component 1735 as described with reference to FIG. 17.

The following provides an overview of aspects of the present disclosure:

Aspect 1: A method for wireless communication at a remote UE, comprising: identifying a quasi-colocation relationship between one or more control regions of resources during a time interval and a plurality of data regions of the resources during the time interval for communications via a plurality of relay UEs, the plurality of data regions comprising at least a first data region for a first relay UE of the plurality of relay UEs and a second data region for a second relay UE of the plurality of relay UEs; identifying, according to the quasi-colocation relationship, one or more symbol periods of the time interval for one or more automatic gain control measurements for the one or more control regions and the plurality of data regions; performing the one or more automatic gain control measurements on signals received in the one or more symbol periods of the time interval for the one or more automatic gain control measurements; and receiving, based at least in part on the one or more automatic gain control measurements, a first data message from the first relay UE in the first data region and a second data message from the second relay UE in the second data region.

Aspect 2: The method of aspect 1, wherein identifying the one or more symbol periods of the time interval for the one or more automatic gain control measurements further comprises: identifying, according to the quasi-colocation relationship, a first symbol period preceding the first data region for the first relay UE and a second symbol period preceding the second data region for the second relay UE for the one or more automatic gain control measurements, wherein performing the one or more automatic gain control measurements comprises performing the one or more automatic gain control measurements on the signals received in the first symbol period and the second symbol period.

Aspect 3: The method of any of aspects 1 through 2, wherein identifying the one or more symbol periods of the time interval for the one or more automatic gain control measurements further comprises: identifying, according to the quasi-colocation relationship, a symbol period preceding a control region of the one or more control regions and the second data region for the second relay UE for the one or more automatic gain control measurements, wherein the control region and the second data region are frequency division multiplexed, and wherein performing the one or more automatic gain control measurements comprises performing the one or more automatic gain control measurements on the signals received in the identified symbol period.

Aspect 4: The method of any of aspects 1 through 3, wherein identifying the one or more symbol periods of the time interval for the one or more automatic gain control measurements further comprises: identifying, according to the quasi-colocation relationship, a first symbol period preceding a control region of the one or more control regions and the first data region for the first relay UE for the one or more automatic gain control measurements, wherein the control region and the first data region are frequency division multiplexed; and identifying, according to the quasi-colocation relationship, a second symbol period preceding the second data region for the second relay UE for the one or more automatic gain control measurements, wherein performing the one or more automatic gain control measurements comprises performing the one or more automatic gain control measurements on the signals received in the first symbol period and the second symbol period.

Aspect 5: The method of any of aspects 1 through 4, wherein identifying the one or more symbol periods of the time interval for the one or more automatic gain control measurements further comprises: identifying, according to the quasi-colocation relationship, a first symbol period preceding a control region of the one or more control regions and the first data region for the first relay UE for the one or more automatic gain control measurements, wherein the control region and the first data region are included in a first slot of the time interval; and identifying, according to the quasi-colocation relationship, a second symbol period preceding the second data region for the second relay UE for the one or more automatic gain control measurements, wherein the second data region is included in a second slot of the time interval, and wherein performing the one or more automatic gain control measurements comprises performing the one or more automatic gain control measurements on the signals received in the first symbol period and the second symbol period.

Aspect 6: The method of aspect 5, further comprising: transmitting an indication of a capability of the remote UE to track simultaneously at least two sidelink quasi-colocation parameters.

Aspect 7: The method of any of aspects 1 through 6, wherein identifying the quasi-colocation relationship between the one or more control regions and the plurality of data regions further comprises: identifying the quasi-colocation relationship between a first control region of the one or more control regions and the first data region, and between one or more reference signals in the first control region and the second data region.

Aspect 8: The method of aspect 7, wherein identifying the one or more symbol periods of the time interval for the one or more automatic gain control measurements further comprises: identifying, according to the quasi-colocation relationship, a symbol period preceding the first control region comprising the one or more reference signals for the one or more automatic gain control measurements, wherein performing the one or more automatic gain control measurements comprises performing the one or more automatic gain control measurements on the signals received in the identified symbol period.

Aspect 9: The method of any of aspects 1 through 8, further comprising: performing a channel state information measurement to calculate a relative power offset between the first data region for the first relay UE and the second data region for the second relay UE.

Aspect 10: The method of aspect 9, wherein identifying the one or more symbol periods of the time interval for the one or more automatic gain control measurements further comprises: identifying, according to the quasi-colocation relationship, a symbol period preceding a first control region of the one or more control regions for the one or more automatic gain control measurements, wherein performing the one or more automatic gain control measurements comprises performing the one or more automatic gain control measurements on the signals received in the identified symbol period.

Aspect 11: The method of aspect 10, wherein a second control region of the one or more control regions succeeds the first control region, the first control region being associated with the first relay UE and the second control region being associated with the second relay UE.

Aspect 12: The method of any of aspects 1 through 11, wherein identifying the one or more symbol periods of the time interval for the one or more automatic gain control measurements further comprises: identifying, according to the quasi-colocation relationship, a first symbol period preceding a first control region of the one or more control regions and a second control region of the one or more control regions for the one or more automatic gain control measurements, wherein the first control region and the second control region are frequency division multiplexed, the first control region being associated with the first relay UE and the second control region being associated with the second relay UE.

Aspect 13: The method of aspect 12, further comprising: identifying, according to the quasi-colocation relationship, a second symbol period preceding the first data region and the second control region for the one or more automatic gain control measurements, wherein the first data region and the second data region are frequency division multiplexed, and wherein performing the one or more automatic gain control measurements comprises performing the one or more automatic gain control measurements on the signals received in the first symbol period and the second symbol period.

Aspect 14: The method of any of aspects 1 through 13, further comprising: receiving an indication of the quasi-colocation relationship between the one or more control regions of the time interval and the plurality of data regions of the time interval for the communications via the plurality of relay UEs, wherein the indication comprises at least one of a radio resource control signal or a sidelink control information.

Aspect 15: A method for wireless communication at a wireless node, comprising: identifying a quasi-colocation relationship between one or more control regions of resource during a time interval and a plurality of data regions of the resources during the time interval for communications of the wireless node with a remote UE via a plurality of relay UEs, the plurality of data regions comprising at least a first data region for a first relay UE of the plurality of relay UEs and a second data region for a second relay UE of the plurality of relay UEs; identifying, according to the quasi-colocation relationship, one or more symbol periods of the time interval for one or more automatic gain control measurements by the remote UE for the one or more control regions and the plurality of data regions; transmitting, based at least in part on identifying the one or more symbol periods of the time interval for the one or more automatic gain control measurements, a first data message to the remote UE via the first relay UE in the first data region and a second data message to the remote UE via the second relay UE in the second data region.

Aspect 16: The method of aspect 15, wherein identifying the one or more symbol periods of the time interval for the one or more automatic gain control measurements further comprises: identifying, according to the quasi-colocation relationship, a first symbol period preceding the first data region for the first relay UE and a second symbol period preceding the second data region for the second relay UE for the one or more automatic gain control measurements.

Aspect 17: The method of any of aspects 15 through 16, wherein identifying the one or more symbol periods of the time interval for the one or more automatic gain control measurements further comprises: identifying, according to the quasi-colocation relationship, a symbol period preceding a control region of the one or more control regions and the second data region for the second relay UE for the one or more automatic gain control measurements, wherein the control region and the second data region are frequency division multiplexed.

Aspect 18: The method of any of aspects 15 through 17, wherein identifying the one or more symbol periods of the time interval for the one or more automatic gain control measurements further comprises: identifying, according to the quasi-colocation relationship, a first symbol period preceding a control region of the one or more control regions and the first data region for the first relay UE for the one or more automatic gain control measurements, wherein the control region and the first data region are frequency division multiplexed; and identifying, according to the quasi-colocation relationship, a second symbol period preceding the second data region for the second relay UE for the one or more automatic gain control measurements.

Aspect 19: The method of any of aspects 15 through 18, wherein identifying the one or more symbol periods of the time interval for the one or more automatic gain control measurements further comprises: identifying, according to the quasi-colocation relationship, a first symbol period preceding a control region of the one or more control regions and the first data region for the first relay UE for the one or more automatic gain control measurements, wherein the control region and the first data region are included in a first slot of the time interval; and identifying, according to the quasi-colocation relationship, a second symbol period preceding the second data region for the second relay UE for the one or more automatic gain control measurements, wherein the second data region is included in a second slot of the time interval.

Aspect 20: The method of aspect 19, further comprising: receiving, from the remote UE, an indication of a capability of the remote UE to simultaneously track at least two sidelink quasi-colocation parameters.

Aspect 21: The method of any of aspects 15 through 20, wherein identifying the quasi-colocation relationship between the one or more control regions and the plurality of data regions further comprises: identifying the quasi-colocation relationship between a first control region of the one or more control regions and the first data region, and between one or more reference signals in the first control region and the second data region; and transmitting the one or more reference signals in the first control region.

Aspect 22: The method of any of aspects 15 through 21, wherein identifying the one or more symbol periods of the time interval for the one or more automatic gain control measurements further comprises: identifying, according to the quasi-colocation relationship, a first symbol period preceding a first control region of the one or more control regions and a second control region of the one or more control regions for the one or more automatic gain control measurements, wherein the first control region and the second control region are frequency division multiplexed, the first control region being associated with the first relay UE and the second control region being associated with the second relay UE.

Aspect 23: The method of aspect 22, further comprising: identifying, according to the quasi-colocation relationship, a second symbol period preceding the first data region and the second control region for the one or more automatic gain control measurements, wherein the first data region and the second data region are frequency division multiplexed.

Aspect 24: The method of any of aspects 15 through 23, further comprising: transmitting an indication of the quasi-colocation relationship between the one or more control regions of the time interval and the plurality of data regions of the time interval for the communications of the wireless node with the remote UE via the plurality of relay UEs, wherein the indication comprises at least one of a radio resource control signal or a sidelink control information.

Aspect 25: The method of any of aspects 15 through 24, wherein the wireless node comprises a UE or a base station.

Aspect 26: An apparatus for wireless communication at a remote UE, comprising a processor; memory coupled with the processor; and instructions stored in the memory and executable by the processor to cause the apparatus to perform a method of any of aspects 1 through 14.

Aspect 27: An apparatus for wireless communication at a remote UE, comprising at least one means for performing a method of any of aspects 1 through 14.

Aspect 28: A non-transitory computer-readable medium storing code for wireless communication at a remote UE, the code comprising instructions executable by a processor to perform a method of any of aspects 1 through 14.

Aspect 29: An apparatus for wireless communication at a wireless node, comprising a processor; memory coupled with the processor; and instructions stored in the memory and executable by the processor to cause the apparatus to perform a method of any of aspects 15 through 25.

Aspect 30: An apparatus for wireless communication at a wireless node, comprising at least one means for performing a method of any of aspects 15 through 25.

Aspect 31: A non-transitory computer-readable medium storing code for wireless communication at a wireless node, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a remote user equipment (UE), comprising:
    identifying a quasi-colocation relationship between one or more control regions of resources during a time interval and a plurality of data regions of the resources during the time interval for communications via a plurality of relay UEs, the plurality of data regions comprising at least a first data region for a first relay UE of the plurality of relay UEs and a second data region for a second relay UE of the plurality of relay UEs;
    identifying, according to the quasi-colocation relationship, one or more symbol periods of the time interval for one or more automatic gain control measurements for the one or more control regions and the plurality of data regions;
    performing the one or more automatic gain control measurements on signals received in the one or more symbol periods of the time interval for the one or more automatic gain control measurements; and
    receiving, based at least in part on the one or more automatic gain control measurements, a first data message from the first relay UE in the first data region and a second data message from the second relay UE in the second data region.

2. The method of claim 1, wherein identifying the one or more symbol periods of the time interval for the one or more automatic gain control measurements further comprises:
    identifying, according to the quasi-colocation relationship, a first symbol period preceding the first data region for the first relay UE and a second symbol period preceding the second data region for the second relay UE for the one or more automatic gain control measurements, wherein performing the one or more automatic gain control measurements comprises performing the one or more automatic gain control measurements on the signals received in the first symbol period and the second symbol period.

3. The method of claim 1, wherein identifying the one or more symbol periods of the time interval for the one or more automatic gain control measurements further comprises:
    identifying, according to the quasi-colocation relationship, a symbol period preceding a control region of the one or more control regions and the second data region for the second relay UE for the one or more automatic gain control measurements, wherein the control region and the second data region are frequency division multiplexed, and wherein performing the one or more automatic gain control measurements comprises performing the one or more automatic gain control measurements on the signals received in the identified symbol period.

4. The method of claim 1, wherein identifying the one or more symbol periods of the time interval for the one or more automatic gain control measurements further comprises:
    identifying, according to the quasi-colocation relationship, a first symbol period preceding a control region of the one or more control regions and the first data region for the first relay UE for the one or more automatic gain control measurements, wherein the control region and the first data region are frequency division multiplexed; and
    identifying, according to the quasi-colocation relationship, a second symbol period preceding the second data region for the second relay UE for the one or more automatic gain control measurements, wherein performing the one or more automatic gain control measurements comprises performing the one or more automatic gain control measurements on the signals received in the first symbol period and the second symbol period.

5. The method of claim 1, wherein identifying the one or more symbol periods of the time interval for the one or more automatic gain control measurements further comprises:
    identifying, according to the quasi-colocation relationship, a first symbol period preceding a control region of the one or more control regions and the first data region for the first relay UE for the one or more automatic gain control measurements, wherein the control region and the first data region are included in a first slot of the time interval; and
    identifying, according to the quasi-colocation relationship, a second symbol period preceding the second data region for the second relay UE for the one or more automatic gain control measurements, wherein the second data region is included in a second slot of the time interval, and wherein performing the one or more automatic gain control measurements comprises performing the one or more automatic gain control measurements on the signals received in the first symbol period and the second symbol period.

6. The method of claim 5, further comprising:
    transmitting an indication of a capability of the remote UE to track simultaneously at least two sidelink quasi-colocation parameters.

7. The method of claim 1, wherein identifying the quasi-colocation relationship between the one or more control regions and the plurality of data regions further comprises:

identifying the quasi-colocation relationship between a first control region of the one or more control regions and the first data region, and between one or more reference signals in the first control region and the second data region.

8. The method of claim 7, wherein identifying the one or more symbol periods of the time interval for the one or more automatic gain control measurements further comprises:
identifying, according to the quasi-colocation relationship, a symbol period preceding the first control region comprising the one or more reference signals for the one or more automatic gain control measurements, wherein performing the one or more automatic gain control measurements comprises performing the one or more automatic gain control measurements on the signals received in the identified symbol period.

9. The method of claim 1, further comprising:
performing a channel state information measurement to calculate a relative power offset between the first data region for the first relay UE and the second data region for the second relay UE.

10. The method of claim 9, wherein identifying the one or more symbol periods of the time interval for the one or more automatic gain control measurements further comprises:
identifying, according to the quasi-colocation relationship, a symbol period preceding a first control region of the one or more control regions for the one or more automatic gain control measurements, wherein performing the one or more automatic gain control measurements comprises performing the one or more automatic gain control measurements on the signals received in the identified symbol period.

11. The method of claim 10, wherein a second control region of the one or more control regions succeeds the first control region, the first control region being associated with the first relay UE and the second control region being associated with the second relay UE.

12. The method of claim 1, wherein identifying the one or more symbol periods of the time interval for the one or more automatic gain control measurements further comprises:
identifying, according to the quasi-colocation relationship, a first symbol period preceding a first control region of the one or more control regions and a second control region of the one or more control regions for the one or more automatic gain control measurements, wherein the first control region and the second control region are frequency division multiplexed, the first control region being associated with the first relay UE and the second control region being associated with the second relay UE.

13. The method of claim 12, further comprising:
identifying, according to the quasi-colocation relationship, a second symbol period preceding the first data region and the second data region for the one or more automatic gain control measurements, wherein the first data region and the second data region are frequency division multiplexed, and wherein performing the one or more automatic gain control measurements comprises performing the one or more automatic gain control measurements on the signals received in the first symbol period and the second symbol period.

14. The method of claim 1, further comprising:
receiving an indication of the quasi-colocation relationship between the one or more control regions of the time interval and the plurality of data regions of the time interval for the communications via the plurality of relay UEs, wherein the indication comprises at least one of a radio resource control signal or a sidelink control information.

15. A method for wireless communication at a wireless node, comprising:
identifying a quasi-colocation relationship between one or more control regions of resource during a time interval and a plurality of data regions of the resources during the time interval for communications of the wireless node with a remote user equipment (UE) via a plurality of relay UEs, the plurality of data regions comprising at least a first data region for a first relay UE of the plurality of relay UEs and a second data region for a second relay UE of the plurality of relay UEs;
identifying, according to the quasi-colocation relationship, one or more symbol periods of the time interval for one or more automatic gain control measurements by the remote UE for the one or more control regions and the plurality of data regions;
transmitting, based at least in part on identifying the one or more symbol periods of the time interval for the one or more automatic gain control measurements, a first data message to the remote UE via the first relay UE in the first data region and a second data message to the remote UE via the second relay UE in the second data region.

16. The method of claim 15, wherein identifying the one or more symbol periods of the time interval for the one or more automatic gain control measurements further comprises:
identifying, according to the quasi-colocation relationship, a first symbol period preceding the first data region for the first relay UE and a second symbol period preceding the second data region for the second relay UE for the one or more automatic gain control measurements.

17. The method of claim 15, wherein identifying the one or more symbol periods of the time interval for the one or more automatic gain control measurements further comprises:
identifying, according to the quasi-colocation relationship, a symbol period preceding a control region of the one or more control regions and the second data region for the second relay UE for the one or more automatic gain control measurements, wherein the control region and the second data region are frequency division multiplexed.

18. The method of claim 15, wherein identifying the one or more symbol periods of the time interval for the one or more automatic gain control measurements further comprises:
identifying, according to the quasi-colocation relationship, a first symbol period preceding a control region of the one or more control regions and the first data region for the first relay UE for the one or more automatic gain control measurements, wherein the control region and the first data region are frequency division multiplexed; and
identifying, according to the quasi-colocation relationship, a second symbol period preceding the second data region for the second relay UE for the one or more automatic gain control measurements.

19. The method of claim 15, wherein identifying the one or more symbol periods of the time interval for the one or more automatic gain control measurements further comprises:

identifying, according to the quasi-colocation relationship, a first symbol period preceding a control region of the one or more control regions and the first data region for the first relay UE for the one or more automatic gain control measurements, wherein the control region and the first data region are included in a first slot of the time interval; and identifying, according to the quasi-colocation relationship, a second symbol period preceding the second data region for the second relay UE for the one or more automatic gain control measurements, wherein the second data region is included in a second slot of the time interval.

20. The method of claim 19, further comprising:
receiving, from the remote UE, an indication of a capability of the remote UE to simultaneously track at least two sidelink quasi-colocation parameters.

21. The method of claim 15, wherein identifying the quasi-colocation relationship between the one or more control regions and the plurality of data regions further comprises:
identifying the quasi-colocation relationship between a first control region of the one or more control regions and the first data region, and between one or more reference signals in the first control region and the second data region; and
transmitting the one or more reference signals in the first control region.

22. The method of claim 15, wherein identifying the one or more symbol periods of the time interval for the one or more automatic gain control measurements further comprises:
identifying, according to the quasi-colocation relationship, a first symbol period preceding a first control region of the one or more control regions and a second control region of the one or more control regions for the one or more automatic gain control measurements, wherein the first control region and the second control region are frequency division multiplexed, the first control region being associated with the first relay UE and the second control region being associated with the second relay UE.

23. The method of claim 22, further comprising:
identifying, according to the quasi-colocation relationship, a second symbol period preceding the first data region and the second data region for the one or more automatic gain control measurements, wherein the first data region and the second data region are frequency division multiplexed.

24. The method of claim 15, further comprising:
transmitting an indication of the quasi-colocation relationship between the one or more control regions of the time interval and the plurality of data regions of the time interval for the communications of the wireless node with the remote UE via the plurality of relay UEs, wherein the indication comprises at least one of a radio resource control signal or a sidelink control information.

25. The method of claim 15, wherein the wireless node comprises a UE or a base station.

26. An apparatus for wireless communication at a remote user equipment (UE), comprising:
a processor;
memory coupled with the processor; and
instructions stored in the memory and executable by the processor to cause the apparatus to:

identify a quasi-colocation relationship between one or more control regions of resources during a time interval and a plurality of data regions of the resources during the time interval for communications via a plurality of relay UEs, the plurality of data regions comprising at least a first data region for a first relay UE of the plurality of relay UEs and a second data region for a second relay UE of the plurality of relay UEs;
identify, according to the quasi-colocation relationship, one or more symbol periods of the time interval for one or more automatic gain control measurements for the one or more control regions and the plurality of data regions;
perform the one or more automatic gain control measurements on signals received in the one or more symbol periods of the time interval for the one or more automatic gain control measurements; and
receive, based at least in part on the one or more automatic gain control measurements, a first data message from the first relay UE in the first data region and a second data message from the second relay UE in the second data region.

27. The apparatus of claim 26, wherein the instructions to identify the one or more symbol periods of the time interval for the one or more automatic gain control measurements are further executable by the processor to cause the apparatus to:
identify, according to the quasi-colocation relationship, a first symbol period preceding the first data region for the first relay UE and a second symbol period preceding the second data region for the second relay UE for the one or more automatic gain control measurements, wherein performing the one or more automatic gain control measurements comprises performing the one or more automatic gain control measurements on the signals received in the first symbol period and the second symbol period.

28. The apparatus of claim 26, wherein the instructions to identify the one or more symbol periods of the time interval for the one or more automatic gain control measurements are further executable by the processor to cause the apparatus to:
identify, according to the quasi-colocation relationship, a symbol period preceding a control region of the one or more control regions and the second data region for the second relay UE for the one or more automatic gain control measurements, wherein the control region and the second data region are frequency division multiplexed, and wherein performing the one or more automatic gain control measurements comprises performing the one or more automatic gain control measurements on the signals received in the identified symbol period.

29. The apparatus of claim 26, wherein the instructions to identify the one or more symbol periods of the time interval for the one or more automatic gain control measurements are further executable by the processor to cause the apparatus to:
identify, according to the quasi-colocation relationship, a first symbol period preceding a control region of the one or more control regions and the first data region for the first relay UE for the one or more automatic gain control measurements, wherein the control region and the first data region are frequency division multiplexed; and
identify, according to the quasi-colocation relationship, a second symbol period preceding the second data region for the second relay UE for the one or more automatic gain control measurements, wherein performing the one or more automatic gain control measurements comprises performing the one or more automatic gain control measurements on the signals received in the first symbol period and the second symbol period.

30. An apparatus for wireless communication at a wireless node, comprising:
- a processor;
- memory coupled with the processor; and
- instructions stored in the memory and executable by the processor to cause the apparatus to:
  - identify a quasi-colocation relationship between one or more control regions of resource during a time interval and a plurality of data regions of the resources during the time interval for communications of the wireless node with a remote user equipment (UE) via a plurality of relay UEs, the plurality of data regions comprising at least a first data region for a first relay UE of the plurality of relay UEs and a second data region for a second relay UE of the plurality of relay UEs;
  - identify, according to the quasi-colocation relationship, one or more symbol periods of the time interval for one or more automatic gain control measurements by the remote UE for the one or more control regions and the plurality of data regions;
  - transmit, based at least in part on identifying the one or more symbol periods of the time interval for the one or more automatic gain control measurements, a first data message to the remote UE via the first relay UE in the first data region and a second data message to the remote UE via the second relay UE in the second data region.

* * * * *